United States Patent
Kojima et al.

(10) Patent No.: US 11,296,633 B2
(45) Date of Patent: Apr. 5, 2022

(54) ROTARY MACHINE CONTROL DEVICE

(71) Applicant: Mitsubishi Electric Corporation, Tokyo (JP)

(72) Inventors: Tetsuya Kojima, Tokyo (JP); Hisanori Yamasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/959,446

(22) PCT Filed: Nov. 16, 2018

(86) PCT No.: PCT/JP2018/042568
§ 371 (c)(1),
(2) Date: Jul. 1, 2020

(87) PCT Pub. No.: WO2019/138691
PCT Pub. Date: Jul. 18, 2019

(65) Prior Publication Data
US 2020/0373864 A1 Nov. 26, 2020

(30) Foreign Application Priority Data

Jan. 12, 2018 (JP) .............................. JP2018-003786

(51) Int. Cl.
*H02P 21/13* (2006.01)
*H02P 21/18* (2016.01)
*H02P 25/089* (2016.01)

(52) U.S. Cl.
CPC .............. *H02P 21/13* (2013.01); *H02P 21/18* (2016.02); *H02P 25/089* (2016.02)

(58) Field of Classification Search
CPC ........ H02P 21/13; H02P 21/18; H02P 25/089; H02P 6/20; H02K 1/246; H02K 3/28
See application file for complete search history.

(56) References Cited

U.S. PATENT DOCUMENTS 5,144,564 A * 9/1992 Naidu .................. H02P 6/18
 318/721
6,498,452 B1 12/2002 Luukko
(Continued)

FOREIGN PATENT DOCUMENTS

EP 2493067 A1 8/2012
EP 1484834 B9 1/2017
(Continued)

OTHER PUBLICATIONS

International Search Report (PCT/ISA/210) dated Feb. 19, 2019, by the Japanese Patent Office as the International Searching Authority for International Application No. PCT/JP2018/042568.
Written Opinion (PCT/ISA/237) dated Feb. 19, 2019, by the Japanese Patent Office as the International Searching Authority for International Application No. PCT/JP2018/042568.
(Continued)

*Primary Examiner* — Said Bouziane
(74) *Attorney, Agent, or Firm* — Buchanan Ingersoll & Rooney PC

(57) ABSTRACT

A rotary machine control device includes a current detector to detect a rotary machine current flowing through a rotary machine, a position estimator to estimate a rotor position, a controller to output a rotary machine voltage instruction for driving the rotary machine on the basis of the rotary machine current and the rotor position, and a voltage applicator to apply a voltage to the rotary machine on the basis of the rotary machine voltage instruction. The position estimator estimates the rotor position from a flux linkage inductance variable component produced by an inductance variable component and the rotary machine current.

13 Claims, 13 Drawing Sheets

(56) References Cited

U.S. PATENT DOCUMENTS

| | | | |
|---|---|---|---|
| 6,756,753 B1* | 6/2004 | Marcinkiewicz | H02P 6/18 318/400.04 |
| 2003/0025475 A1 | 2/2003 | Won et al. | |
| 2003/0111975 A1* | 6/2003 | Slater | H02P 25/089 318/701 |
| 2004/0201358 A1* | 10/2004 | Kawaji | H02P 25/092 318/701 |
| 2008/0129243 A1* | 6/2008 | Nashiki | H02K 1/246 318/701 |
| 2008/0297099 A1* | 12/2008 | Maekawa | D06F 37/304 318/799 |
| 2010/0194319 A1 | 8/2010 | Ito et al. | |
| 2011/0304290 A1 | 12/2011 | Ito et al. | |
| 2017/0317623 A1 | 11/2017 | Taniguchi et al. | |

FOREIGN PATENT DOCUMENTS

| | | |
|---|---|---|
| EP | 1324484 B1 | 10/2019 |
| FI | 108095 B | 11/2001 |
| JP | 3571698 B2 | 9/2004 |
| JP | 2008141835 A | 6/2008 |
| JP | 4644010 B2 | 3/2011 |
| JP | 5069306 B2 | 11/2012 |
| JP | 5324646 B2 | 10/2013 |
| WO | 03081765 A1 | 10/2003 |
| WO | 2016121751 A1 | 8/2016 |

OTHER PUBLICATIONS

Office Action dated Mar. 2, 2021, in corresponding India Patent Application No. 202027027271, including English translation of the Office Action. (5 pages).

* cited by examiner

ROTARY MACHINE CONTROL DEVICE

FIELD

The present invention relates to a control device for a rotary machine (hereinafter referred to as "rotary machine control device") that controls a rotary machine whose inductance includes a dynamic component of inductance (hereinafter referred to as "inductance variable component") that changes with the rotor position, by obtaining rotor position information without use of a position sensor for detecting the rotor position.

BACKGROUND

Driving a rotary machine to operate at full performance of the rotary machine requires rotor position information. To this end, a conventional rotary machine control device uses position information detected by a position sensor provided on the rotary machine. However, in view of further reduction of manufacturing cost of rotary machines, size reduction of rotary machines, higher reliability of rotary machines, and the like, technology to drive a rotary machine in a position-sensorless configuration has been developed. Position-sensorless control methods for a rotary machine include a method of estimating the rotor position by applying a high frequency voltage to the rotary machine, and a method of estimating the rotor position on the basis of induced voltage, flux linkage, or the like of the rotary machine without applying a high frequency voltage.

Patent Literature 1 discloses a method of estimating the rotor position by applying a high frequency voltage to the rotary machine. The position-sensorless control method disclosed in Patent Literature 1 includes detecting of a rotary machine current when a high frequency voltage is applied to a rotary machine, and extracting of a high frequency current having the same frequency component as the frequency component of the high frequency voltage. Then, the rotor position is estimated using the characteristic that the inductance of the rotary machine, i.e., the amplitude of the high frequency current, changes at a frequency twice as high as the frequency of the rotor position electrical angle. Such method using a high frequency voltage provides accurate estimation of rotor position even at zero velocity or at a low velocity near zero velocity of the rotary machine, but on the other hand, the high frequency voltage superimposed causes torque pulsation or noise. In addition, in the method that uses a high frequency voltage, superimposition of the high frequency voltage on the voltage applied to the winding of the rotary machine and on the current flowing through the winding of the rotary machine accordingly reduces either the maximum torque of the rotary machine or the rotational speed of the rotary machine, or reduces both thereof.

Patent Literatures 2, 3, and 4 each disclose a method of estimating the rotor position without applying a high frequency voltage. The methods of estimating the rotor position without applying a high frequency voltage each include subtraction of the product of the inductance value along a q-axis or d-axis of the rotor and the rotary machine current from the flux linkage of the rotary machine thereby to extract components that rotate in synchronism with the rotor position, of the flux linkage. These components respectively include an active flux with respect to the d-axis and an active flux with respect to the q-axis. As used herein, the direction of the rotor that maximizes the inductance is defined as d-axis, while the direction of the rotor that minimizes the inductance is defined as q-axis. The d-axis is an axis referred to as magnetic flux axis, and the q-axis is an axis referred to as torque axis. In Patent Literature 2, the active flux is estimated by an observer to estimate the rotor position. In Patent Literature 3, induced voltage produced by the active flux is used to estimate the rotor position.

The position-sensorless control methods disclosed in Patent Literatures 2 and 3 will cause active flux to have a value of zero when the rotary machine current has no d-axis component or no q-axis component, and thus fail to estimate the rotor position. That is, the position-sensorless control methods disclosed in Patent Literatures 2 and 3 fail to estimate the rotor position depending on the current flow direction of the rotary machine. The position-sensorless control method disclosed in Patent Literature 4 solves this problem by weighting both the active fluxes with respect to the d-axis and to the q-axis on the basis of the d-axis component and the q-axis component of the rotary machine current or of the flux linkage, and using the result in the estimation of the rotor position.

CITATION LIST

Patent Literature

Patent Literature 1: Japanese Patent No. 5069306
Patent Literature 2: Japanese Patent No. 4644010
Patent Literature 3: Japanese Patent No. 3571698
Patent Literature 4: European Patent Application Laid-open No. 2493067

SUMMARY

Technical Problem

However, the weighting operation based on the d-axis component and the q-axis component of the rotary machine current or of the flux linkage disclosed in Patent Literature 4 has an issue of complexity of control design, and of control processing as well, of rotor position estimation. Thus, the technology disclosed in Patent Literature 4 has an issue of complexity of the configuration for estimating the rotor position.

The present invention has been made in view of the foregoing, and it is an object of the present invention to provide a rotary machine control device capable of estimating the rotor position irrespective of the current flow direction of a rotary machine, with a simpler configuration.

Solution to Problem

To solve the problem and achieve the object described above, a rotary machine control device according to an aspect of the present invention is a rotary machine control device for controlling a rotary machine whose inductance includes an inductance variable component that changes with a rotor position. The rotary machine control device includes a current detector to detect a rotary machine current flowing through the rotary machine. The rotary machine control device includes: a position estimator to estimate the rotor position; a controller to output a rotary machine voltage instruction for driving the rotary machine on a basis of the rotary machine current and the rotor position; and a voltage applicator to apply a voltage to the rotary machine on a basis of the rotary machine voltage instruction. The position estimator estimates the rotor position from a flux linkage inductance variable component produced by the inductance variable component and the rotary machine current.

Advantageous Effects of Invention

The present invention provides an advantage in being capable of estimating the rotor position irrespective of the current flow direction of a rotary machine, with a simpler configuration.

DESCRIPTION OF EMBODIMENTS

A rotary machine control device according to embodiments of the present invention will be described in detail below with reference to the drawings. Note that these embodiments are not intended to limit the scope of this invention.

First Embodiment

Figure 1:
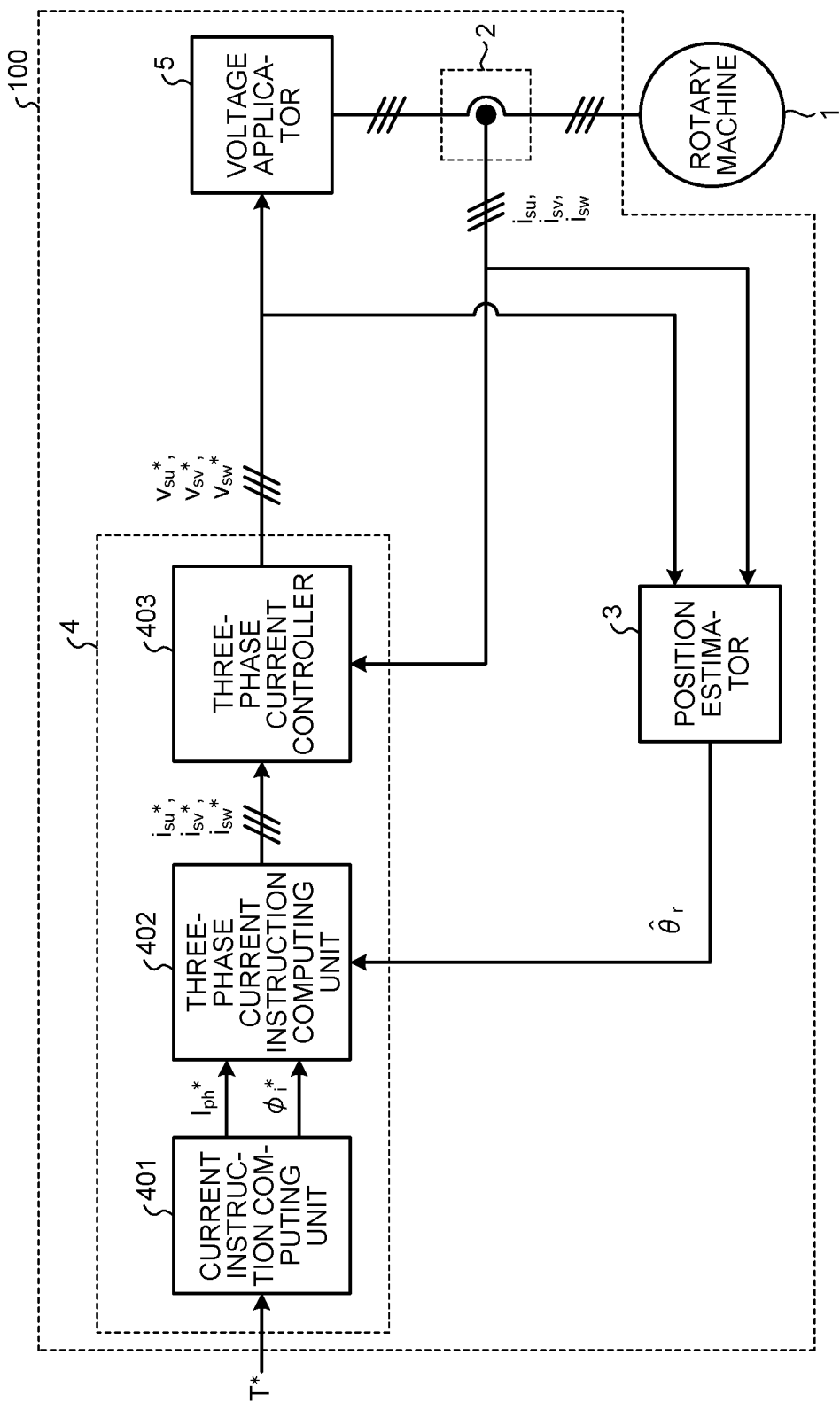
FIG. 1 is a diagram illustrating a configuration of a rotary machine control device according to a first embodiment of the present invention.

FIG. 1 is a diagram illustrating a configuration of a rotary machine control device according to a first embodiment of the present invention. A rotary machine control device 100 according to the first embodiment includes a voltage applicator 5, which applies an alternating current (AC) voltage to a rotary machine 1 according to rotary machine voltage instructions $v_{su}^*$, $v_{sv}^*$, and $v_{sw}^*$ for driving the rotary machine; and a current detector 2, which detects an AC current supplied from the voltage applicator 5 to the rotary machine 1, and outputs the AC current detected, as rotary machine currents $i_{su}$, $i_{sv}$, and $i_{sw}$. The rotary machine control device 100 also includes a position estimator 3, which computes an estimated rotor position $\theta'_r$, which is an electrical angle, using the rotary machine voltage instructions $v_{su}^*$, $v_{sv}^*$, and $v_{sw}^*$ and the rotary machine currents $i_{su}$, $i_{sv}$, and $i_{sw}$; and a controller 4. The estimated rotor position $\theta^*_r$ is an estimated value of rotor position, which is the rotational position of a rotor (not illustrated) included in the rotary machine 1. The estimated rotor position $\hat{\theta}_r$ is expressed in an electrical angle. The rotary machine 1 controlled by the rotary machine control device 100 is a synchronous reluctance motor. A synchronous reluctance motor is a motor whose inductance includes an inductance variable component that changes with the rotor position. Inductance has a value obtained by dividing flux linkage of the stator winding by the stator current value. The rotary machine 1 may hereinafter be referred to simply as "rotary machine". The voltage applicator 5 is connected to the rotary machine via three lines of U, V, and W. The current detector 2 detects AC currents flowing through these lines. Hereinafter, the direction of the rotor that maximizes the inductance is referred to as d-axis, and the direction of the rotor that minimizes the inductance is referred to as q-axis. The rotor position is herein represented with respect to the d-axis of the rotor.

The controller 4 includes a current instruction computing unit 401, a three-phase current instruction computing unit 402, and a three-phase current controller 403, and thus computes the rotary machine voltage instructions $v_{su}^*$, $v_{sv}^*$, and $v_{sw}^*$ for causing the rotary machine to generate an output corresponding to a torque instruction value T*.

The current instruction computing unit 401 computes a current root mean square (RMS) value instruction $I_{ph}^*$ and a current flow angle instruction $\varphi_i^*$ required for the rotary machine to generate an output corresponding to the torque instruction value T*. The current flow angle instruction $\varphi_i^*$ is an instruction on the current flow angle, which represents the angle between the actual rotor position and the rotary machine current. In this regard, the current RMS value instruction $I_{ph}^*$ and the current flow angle instruction $\varphi_i^*$ are selected to minimize the current RMS value for the torque, i.e., the copper loss of the rotary machine.

The three-phase current instruction computing unit 402 computes three-phase current instructions $i_{su}^*$, $i_{sv}^*$, and $i_{sw}^*$ using the current RMS value instruction $I_{ph}^*$, the current flow angle instruction $\varphi_i^*$, and the estimated rotor position $\hat{\theta}_r$, as shown by Formula (1) below.

[Formula 1]

$$i_{su}^* = \sqrt{2}\, I_{ph}^* \cos(\theta_r + \varphi_i^*)$$
$$i_{sv}^* = \sqrt{2}\, I_{ph}^* \cos\left(\theta_r + \varphi_i^* - \frac{2}{3}\pi\right)$$
$$i_{sw}^* = \sqrt{2}\, I_{ph}^* \cos\left(\theta_r + \varphi_i^* + \frac{2}{3}\pi\right)$$

(1)

The three-phase current controller 403 computes the rotary machine voltage instructions $v_{su}^*$, $v_{sv}^*$, and $v_{sw}^*$. The rotary machine voltage instructions $v_{su}^*$, $v_{sv}^*$, and $v_{sw}^*$ are obtained by providing, for example, proportional integral (PI) control on the rotary machine currents $i_{su}$, $i_{sv}$, and $i_{sw}$ such that the rotary machine currents $i_{su}$, $i_{sv}$, and $i_{sw}$ represented in a three-phase reference frame become the three-phase current instructions $i_{su}^*$, $i_{sv}^*$, and $i_{sw}^*$.

Figure 2:
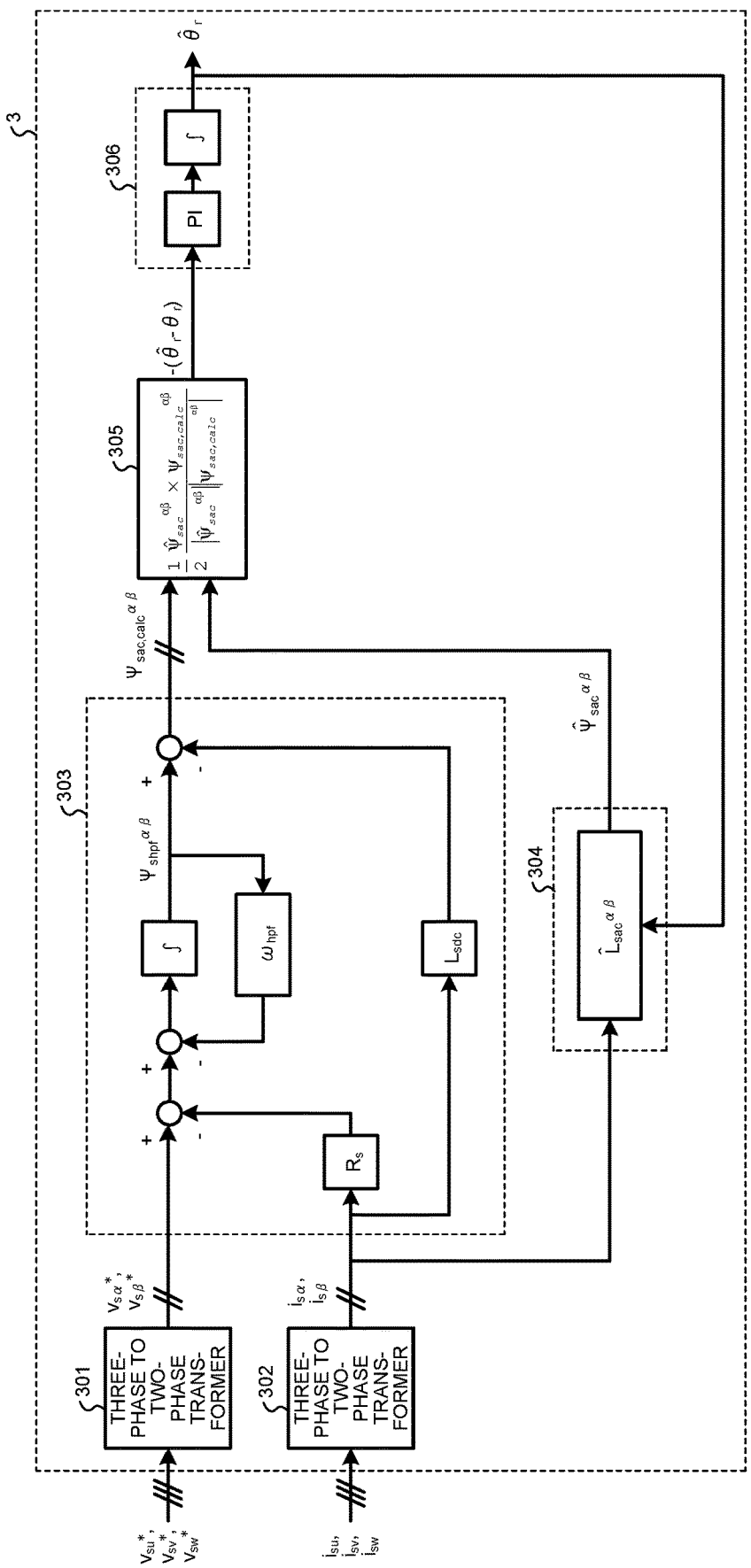
FIG. 2 is a diagram illustrating a configuration of a position estimator illustrated in FIG. 1.

FIG. 2 is a diagram illustrating a configuration of the position estimator illustrated in FIG. 1. As illustrated in FIG. 2, the position estimator 3 includes a three-phase to two-phase transformer 301, a three-phase to two-phase transformer 302, a flux linkage inductance variable component computing unit 303, a flux linkage inductance variable component estimator 304, a rotor position estimation error computing unit 305, and a rotor position computing unit 306. In the following description, the flux linkage inductance variable component computing unit 303 may also be referred to as "dynamic component computing unit 303", the flux linkage inductance variable component estimator 304 may also be referred to as "dynamic component estimator 304", and the rotor position estimation error computing unit 305 may also be referred to as "estimation error computing unit 305".

The three-phase to two-phase transformer 301 transforms the rotary machine voltage instructions $v_{su}^*$, $v_{sv}^*$, and $v_{sw}^*$ represented in the three-phase reference frame to rotary machine voltage instructions $v_{s\alpha}^*$ and $v_{s\beta}^*$ represented in a two-phase reference frame. Note that "$v_{s\alpha}^*$ and $v_{s\beta}^*$" may hereinafter be denoted by "$v_s^{\alpha\beta*}$". In the first embodiment, the three-phase to two-phase transformation is performed using a transformation matrix $C_{32}$ of Formula (2) below.

[Formula 2]

$$\begin{bmatrix} v_{s\alpha}^* \\ v_{s\beta}^* \end{bmatrix} = \underbrace{\sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix}}_{c_{32}} \begin{bmatrix} v_{su}^* \\ v_{sv}^* \\ v_{sw}^* \end{bmatrix} \quad (2)$$

Similarly, the three-phase to two-phase transformer 302 transforms the rotary machine currents $i_{su}$, $i_{sv}$, and $i_{sw}$ represented in the three-phase reference frame to rotary machine currents $i_{s\alpha}$ and $i_{s\beta}$ represented in the two-phase reference frame. Note that "$i_{s\alpha}$ and $i_{s\beta}$" may hereinafter be denoted by "$i_s^{\alpha\beta}$".

An operation of the dynamic component computing unit 303 will next be described. First, flux linkage $\Psi_s^{\alpha\beta}$ of the rotary machine is obtained by Formula (3) below.

[Formula 3]

$$\Psi_s^{\alpha\beta} = \int (v_s^{\alpha\beta*} - R_s i_s^{\alpha\beta}) dt \quad (3)$$

In Formula (3) above, $v_s^{\alpha\beta*}$ is a rotary machine voltage instruction represented in the two-phase reference frame, the rotary machine current $i_s^{\alpha\beta*}$ is a rotary machine current represented in the two-phase reference frame, and $R_s$ is the winding resistance. In addition, the integration of Formula (3) above can be expressed as Formula (4) below in the s domain of Laplace transform.

[Formula 4]

$$\psi_s^{\alpha\beta} = \frac{v_s^{\alpha\beta*} - R_s i_s^{\alpha\beta}}{s} \quad (4)$$

When the flux linkage $\Psi_s^{\alpha\beta}$ of the rotary machine is computed by integration, the initial value is typically indefinite. Therefore, a high-pass filter (HPF) is used having a cutoff frequency sufficiently lower than the fundamental frequency component of the flux linkage $\Psi_s^{\alpha\beta}$ of the rotary machine. The transfer function of such HPF is expressed as Formula (5) below, where $\omega_{hpf}$ represents the cutoff frequency.

[Formula 5]

$$G_{hpf}(s) = \frac{s}{s + \omega_{hpf}} \quad (5)$$

By applying this HPF to Formula (4) above, flux linkage $\Psi_{shpf}^{\alpha\beta}$ is calculated using Formula (6) below.

[Formula 6]

$$\psi_{shpf}^{\alpha\beta} = \frac{v_s^{\alpha\beta*} - R_s i_s^{\alpha\beta}}{s + \omega_{hpf}} \quad (6)$$

Formula (6) above can be rewritten as Formula (7) below.

[Formula 7]

$$\psi_{shpf}^{\alpha\beta} = \frac{v_s^{\alpha\beta*} - R_s i_s^{\alpha\beta} - \omega_{hpf} \psi_{shpf}^{\alpha\beta}}{s} \quad (7)$$

Meanwhile, the flux linkage $\Psi_s^{\alpha\beta}$ of the rotary machine is expressed as Formula (8) below.

[Formula 8]

$$\psi_s^{\alpha\beta} = L_{sdc} i_s^{\alpha\beta} + \underbrace{L_{mac} \begin{bmatrix} \cos(2\theta_r) & \sin(2\theta_r) \\ \sin(2\theta_r) & -\cos(2\theta_r) \end{bmatrix} i_s^{\alpha\beta}}_{L_{sac}^{\alpha\beta}} \quad (8)$$

In Formula (8) above, $L_{sdc}$ represents the inductance average component, which does not change with the rotor position, and $L_{mac}$ represents the inductance variable component, which changes with the rotor position. $L_{sac}^{\alpha\beta}$ represents the inductance variable component. In addition, a change in the inductance is generally expressed by a sine function or cosine function of $2\theta_r$, where $\theta_r$ represents the rotor position represented by an electrical angle. In the first embodiment, the flux linkage produced by the inductance variable component and by the rotary machine current $i_s^{\alpha\beta}$ is defined as flux linkage inductance variable component. The dynamic component computing unit 303 computes a flux linkage inductance variable component $\Psi_{sac,calc}^{\alpha\beta}$ from Formula (9) below, using the flux linkage $\Psi_{shpf}^{\alpha\beta}$ calculated by Formula (7) above.

[Formula 9]

$$\psi_{sac,calc}^{\alpha\beta} = \frac{v_s^{\alpha\beta*} - R_s i_s^{\alpha\beta} - \omega_{hpf} \psi_{shpf}^{\alpha\beta}}{s} - L_{sdc} i_s^{\alpha\beta} \quad (9)$$

The flux linkage inductance variable component $\Psi_{sac,calc}^{\alpha\beta}$ computed using Formula (9) above is a flux linkage inductance variable component computed value computed by the rotary machine control device 100 according to the first embodiment.

The dynamic component estimator 304 estimates the flux linkage inductance variable component using the rotary machine current $i_s^{\alpha\beta}$ and the estimated rotor position $\hat{\theta}_r$ as shown by Formula (10) below.

[Formula 10]

$$\hat{\psi}_{sac}^{\alpha\beta} = \underbrace{L_{mac}\begin{bmatrix} \cos(2\hat{\theta}_r) & \sin(2\hat{\theta}_r) \\ \sin(2\hat{\theta}_r) & -\cos(2\hat{\theta}_r) \end{bmatrix} i_s^{\alpha\beta}}_{\hat{L}_{sac}^{\alpha\beta}} \quad (10)$$

$\hat{\Psi}_{sac}^{\alpha\beta}$ computed using Formula (10) above is a flux linkage inductance variable component estimated value computed by the rotary machine control device 100 according to the first embodiment. "$\hat{L}_{sac}^{\alpha\beta}$" in Formula (10) above is "inductance variable component estimated value".

The estimation error computing unit 305 computes an estimation error of the rotor position using the flux linkage inductance variable component computed value and the flux linkage inductance variable component estimated value. The cross product of the flux linkage inductance variable component computed value and the flux linkage inductance variable component estimated value is expressed as Formula (11) below using Formula (9) above, i.e., the value resulting from computation of the second term of Formula (8) above and using Formula (10) above.

[Formula 11]

$$\hat{\psi}_{sac}^{\alpha\beta} \times \psi_{sac,calc}^{\alpha\beta} = |\hat{\psi}_{sac}^{\alpha\beta}||\psi_{sac,calc}^{\alpha\beta}|\sin(2(\theta_r - \hat{\theta}_r)) \quad (11)$$

Assuming here that the estimated value and the true value of the rotor position are nearly equal to each other, i.e., $\hat{\theta}_r \approx \theta_r$, the estimation error of the rotor position can be computed using Formula (12) below. The estimation error computing unit 305 outputs the estimation error of the rotor position that has been computed, to the rotor position computing unit 306.

[Formula 12]

$$-(\hat{\theta}_r - \theta_r) = \frac{1}{2} \frac{\hat{\psi}_{sac}^{\alpha\beta} \times \psi_{sac,calc}^{\alpha\beta}}{|\hat{\psi}_{sac}^{\alpha\beta}||\psi_{sac,calc}^{\alpha\beta}|} \quad (12)$$

The rotor position computing unit 306 provides PI control on the estimation error of the rotor position, and then calculates an integral of the result, thus to compute the estimated rotor position $\hat{\theta}_r$.

The technology disclosed in Patent Literature 2 described above subtracts the product of the q-axis inductance $L_{sq}$ of the rotor and the rotary machine current $i_s^{\alpha\beta}$ from the flux linkage $\Psi_s^{\alpha\beta}$ of the rotary machine as shown by Formula (13) below. This extracts the active flux with respect to the d-axis ($\Psi_{ASFd}^{\alpha\beta}$), which is the component that rotates in synchronism with the rotor position, of the flux linkage.

[Formula 13]

$$\psi_{AFd}^{\alpha\beta} = \psi_s^{\alpha\beta} - L_{sq} i_s^{\alpha\beta} \quad (13)$$

The q-axis inductance $L_{sq}$ of the rotor shown in Formula (13) above can be expressed as $L_{sq} = L_{sdc} - L_{mac}$. In addition, the rotary machine current $i_s^{\alpha\beta}$ is expressed as Formula (14) below.

[Formula 14]

$$i_s^{\alpha\beta} = \sqrt{3} I_{ph}\begin{bmatrix} \cos(\theta_r + \varphi_i) \\ \sin(\theta_r + \varphi_i) \end{bmatrix} \quad (14)$$

In Formula (14) above, $I_{ph}$ represents the current RMS value, and $\varphi_i$ represents the current flow angle, i.e., an angular difference between the rotor position and the rotary machine current.

Substitution of Formulae (8) above and (14) above for the right side of Formula (13) above results in the active flux with respect to the d-axis ($\Psi_{AFd}^{\alpha\beta}$) as expressed by Formula (15).

[Formula 15]

$$\psi_{AFd}^{\alpha\beta} = \frac{2L_{mac}\sqrt{3}I_{ph}\cos\phi_i}{(L_{sd}-L_{sq})i_{sd}}\begin{bmatrix} \cos\theta_r \\ \sin\theta_r \end{bmatrix} \quad (15)$$

$L_{sd}$ of Formula (15) above can be expressed as $L_{sd}=L_{sdc}+L_{mac}$. In addition, d- and q-axis currents $i_{sd}$ and $i_{sq}$ are obtained as shown by Formula (16) below by performing rotational coordinate transformation on the α-β-axis currents using the rotor position $\theta_r$. Note that, in the following description, the d- and q-axis currents $i_{sd}$ and $i_{sq}$ may also be referred to as "rotary machine current $i_s^{dq}$".

[Formula 16]

$$\begin{bmatrix} i_{sd} \\ i_{sq} \end{bmatrix} = \underbrace{\begin{bmatrix} \cos\theta_r & \sin\theta_r \\ -\sin\theta_r & \cos\theta_r \end{bmatrix}}_{C_{dq}(\theta_r)}\begin{bmatrix} i_{s\alpha} \\ i_{s\beta} \end{bmatrix} \quad (16)$$

The rotational coordinate transformation of the first embodiment is performed using a transformation matrix $C_{dq}$ of Formula (16) above. The active flux of Formula (15) above is in the rotor d-axis direction, and thus estimation of this using an observer or the like enables the rotor position to be computed. The technology disclosed in Patent Literature 3 described above estimates the rotor position using induced voltage produced by the active flux with respect to the d-axis. In addition, Patent Literature 2 mentioned above also describes active flux with respect to the q-axis obtained by subtraction of the product of the d-axis inductance of the rotor and the rotary machine current, from the flux linkage of the rotary machine as shown by Formula (17) below.

[Formula 17]

$$\psi_{AFq}^{\alpha\beta} = \psi_s^{\alpha\beta} - L_{sd} i_s^{\alpha\beta} \quad (17)$$

Similarly to the case of the d-axis reference, substitution of Formulae (8) and (14) above for the right side of Formula (17) above results in the active flux with respect to the q-axis ($\Psi_{AFq}^{\alpha\beta}$) as expressed by Formula (18) below.

[Formula 18]

$$\psi_{AFq}^{\alpha\beta} = \frac{-2L_{mac}\sqrt{3}I_{ph}\sin\phi_i}{(L_{sq}-L_{sd})i_{sq}}\begin{bmatrix} -\sin\theta_r \\ \cos\theta_r \end{bmatrix} \quad (18)$$

The active flux with respect to the q-axis is in the rotor q-axial direction, and thus estimation of this using an observer or the like enables the rotor position to be estimated. However, the active flux with respect to the d-axis will have a value of zero when the current flow direction is only the rotor q-axial direction, that is, $i_{sd}=0$. Thus, this cannot be used in rotor position estimation. Similarly, the active flux with respect to the q-axis will have a value of zero when the current flow direction is only the rotor d-axis direction, that is, $i_{sq}=0$. Thus, this cannot be used in rotor position estimation. The position-sensorless control method disclosed in Patent Literature 4 described above solves these problems by weighting both the active fluxes with respect to the d-axis and to the q-axis on the basis of the d-axis component and the q-axis component of the rotary machine current or of the flux linkage, and by using the result in the rotor position estimation. However, the weighting operation based on the d-axis component and the q-axis component of the rotary machine current or of the flux linkage involves complexity of control design, and of control processing as well, of rotor position estimation.

The rotary machine control device 100 according to the first embodiment estimates the rotor position using the flux linkage inductance variable component, i.e., the second term of Formula (8) above and Formula (10) above. This flux linkage inductance variable component has both components of the two respective phases, and thus use of this flux linkage inductance variable component enables the rotor position to be estimated irrespective of the current flow direction. In addition, the rotary machine control device 100 according to the first embodiment does not need to perform weighting depending on the current flow direction. Thus, the rotary machine control device 100 according to the first embodiment provides an unprecedented significant advantage in being capable of estimating the rotor position irrespective of the current flow direction of a rotary machine, with a simpler configuration.

Second Embodiment

Figure 3:
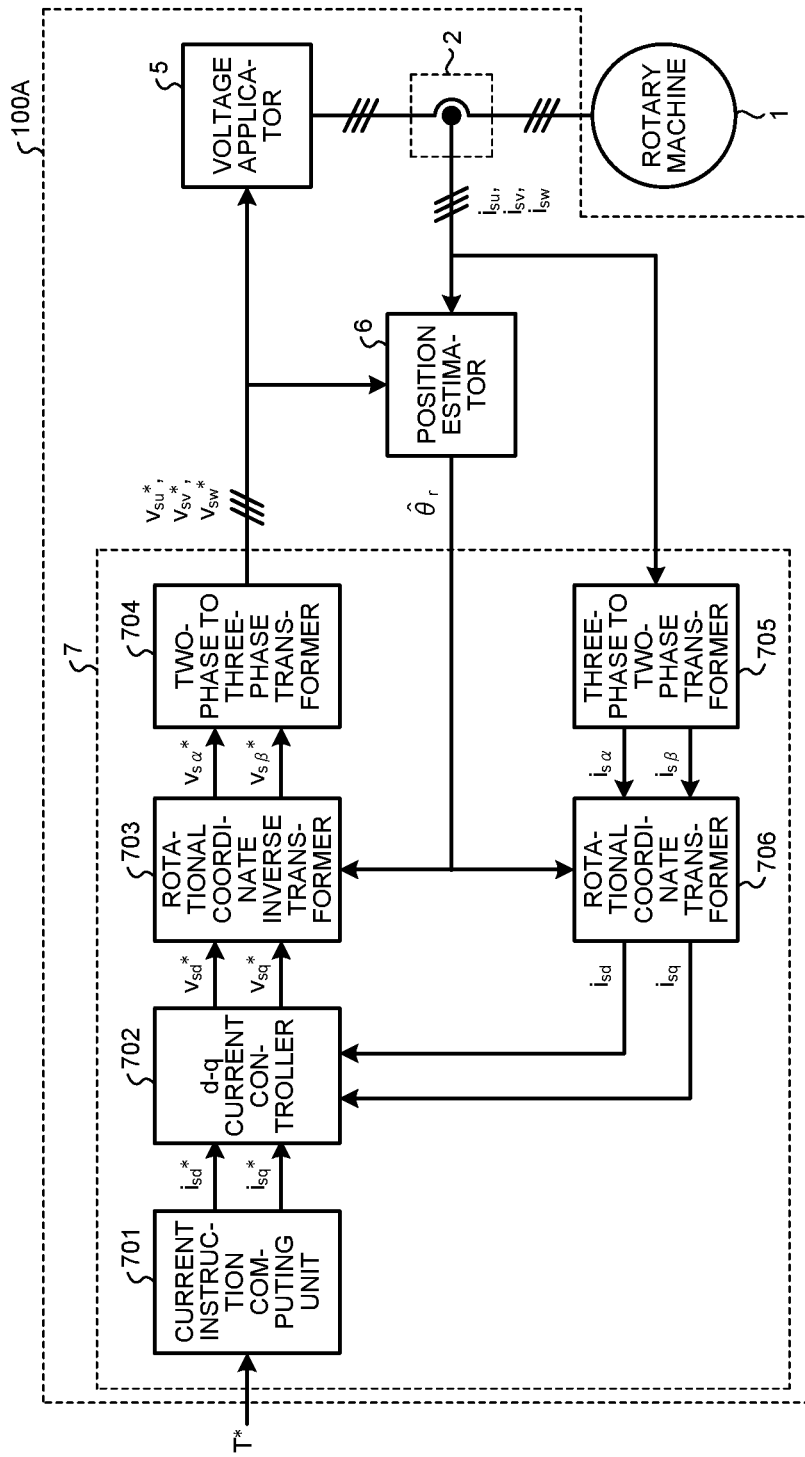
FIG. 3 is a diagram illustrating a configuration of a rotary machine control device according to a second embodiment of the present invention.

FIG. 3 is a diagram illustrating a configuration of a rotary machine control device according to a second embodiment of the present invention. In the rotary machine control device 100 according to the first embodiment, a change in the inductance of the rotary machine is represented by a sine function or cosine function of $2\theta_r$, where $\theta_r$ represents the rotor position. However, the actual change in the inductance does not exactly follow a sine function or cosine function of $2\theta_r$, thereby causing an error in the estimated rotor position. In addition, the rotary machine control device 100 according to the first embodiment requires a sine function and a cosine function of $2\theta_r$ to estimate the flux linkage inductance variable component of Formula (10) above, thereby increasing the amount of computation for control. A rotary machine control device 100A according to the second embodiment is configured to be capable of accurately estimating the rotor position with a small amount of computation for control. The rotary machine control device 100A according to the second embodiment includes a position estimator 6 and a controller 7 in place of the position estimator 3 and the controller 4 illustrated in FIG. 1. The other part of the configuration is the same as, or equivalent to, the configuration of the first embodiment. The same or an equivalent configuration element is designated by the same reference character, and duplicate description thereof will be omitted.

The controller 7 includes a current instruction computing unit 701, a d-q current controller 702, a rotational coordinate inverse transformer 703, a two-phase to three-phase transformer 704, a three-phase to two-phase transformer 705, and a rotational coordinate transformer 706 to compute the rotary machine voltage instructions $v_{su}^*$, $v_{sv}^*$, and $v_{sw}^*$ for causing the rotary machine to generate an output corresponding to the torque instruction value T*.

The current instruction computing unit 701 computes current instructions $i_{sd}^*$ and $i_{sq}^*$ represented in a rotating reference frame required for the rotary machine to generate an output corresponding to the torque instruction value T*. In this regard, the current instructions $i_{sd}^*$ and $i_{sq}^*$ represented in a rotating reference frame are selected to minimize the current RMS value for the torque, i.e., the copper loss of the rotary machine.

The d-q current controller 702 provides control such that the d- and q-axis currents $i_{sd}$ and $i_{sq}$ generated by rotational coordinate transformation of the rotational coordinate transformer 706 become the current instructions $i_{sd}^*$ and $i_{sq}^*$, and computes rotary machine voltage instructions $v_{sd}^*$ and $v_{sq}^*$ represented in the rotating reference frame. This current control is provided using, for example, proportional integral control or the like.

The rotational coordinate inverse transformer 703 performs, as shown by Formula (19) below, rotational coordinate inverse transformation on the rotary machine voltage instructions $v_{sd}^*$ and $v_{sq}^*$ represented in the rotating reference frame to the rotary machine voltage instructions $v_{s\alpha}^*$ and $v_{s\beta}^*$ represented in the two-phase reference frame, using the estimated rotor position $\hat{\theta}_r$ computed by the position estimator 6. In the second embodiment, the rotational coordinate inverse transformation is performed using a transformation matrix $C_{dq}^{-1}(\hat{\theta}_r)$ of Formula (19) below.

[Formula 19]

$$\begin{bmatrix} v_{s\alpha}^* \\ v_{s\beta}^* \end{bmatrix} = \underbrace{\begin{bmatrix} \cos\hat{\theta}_r & -\sin\hat{\theta}_r \\ \sin\hat{\theta}_r & \cos\hat{\theta}_r \end{bmatrix}}_{C_{dq}^{-1}(\hat{\theta}_r)} \begin{bmatrix} v_{sd}^* \\ v_{sq}^* \end{bmatrix} \quad (19)$$

The two-phase to three-phase transformer 704 transforms, as shown by Formula (20) below, the rotary machine voltage instructions $v_{s\alpha}^*$ and $v_{s\beta}^*$ represented in the two-phase reference frame to the rotary machine voltage instructions $v_{su}^*$, $v_{sv}^*$, and $v_{sw}^*$ represented in the three-phase reference frame. In the second embodiment, the two-phase to three-phase transformation is performed using a transformation matrix $C_{23}$ of Formula (20) below.

[Formula 20]

$$\begin{bmatrix} v_{su}^* \\ v_{sv}^* \\ v_{sw}^* \end{bmatrix} = \sqrt{\frac{2}{3}} \underbrace{\begin{bmatrix} 1 & 0 \\ -\frac{1}{2} & \frac{\sqrt{3}}{2} \\ -\frac{1}{2} & -\frac{\sqrt{3}}{2} \end{bmatrix}}_{C_{23}} \begin{bmatrix} v_{s\alpha}^* \\ v_{s\beta}^* \end{bmatrix} \quad (20)$$

The three-phase to two-phase transformer 705 performs three-phase to two-phase transformation on the rotary machine currents $i_{su}$, $i_{sv}$, and $i_{sw}$ represented in the three-phase reference frame to the rotary machine currents $i_{s\alpha}$ and $i_{s\beta}$ represented in the two-phase reference frame. The rotational coordinate transformer 706 performs rotational coordinate transformation on the rotary machine currents $i_{s\alpha}$ and $i_{s\beta}$ represented in the two-phase reference frame to the d- and q-axis currents $i_{sd}$ and $i_{sq}$ represented in the rotating reference frame using the estimated rotor position $\hat{\theta}_r$.

Figure 4:
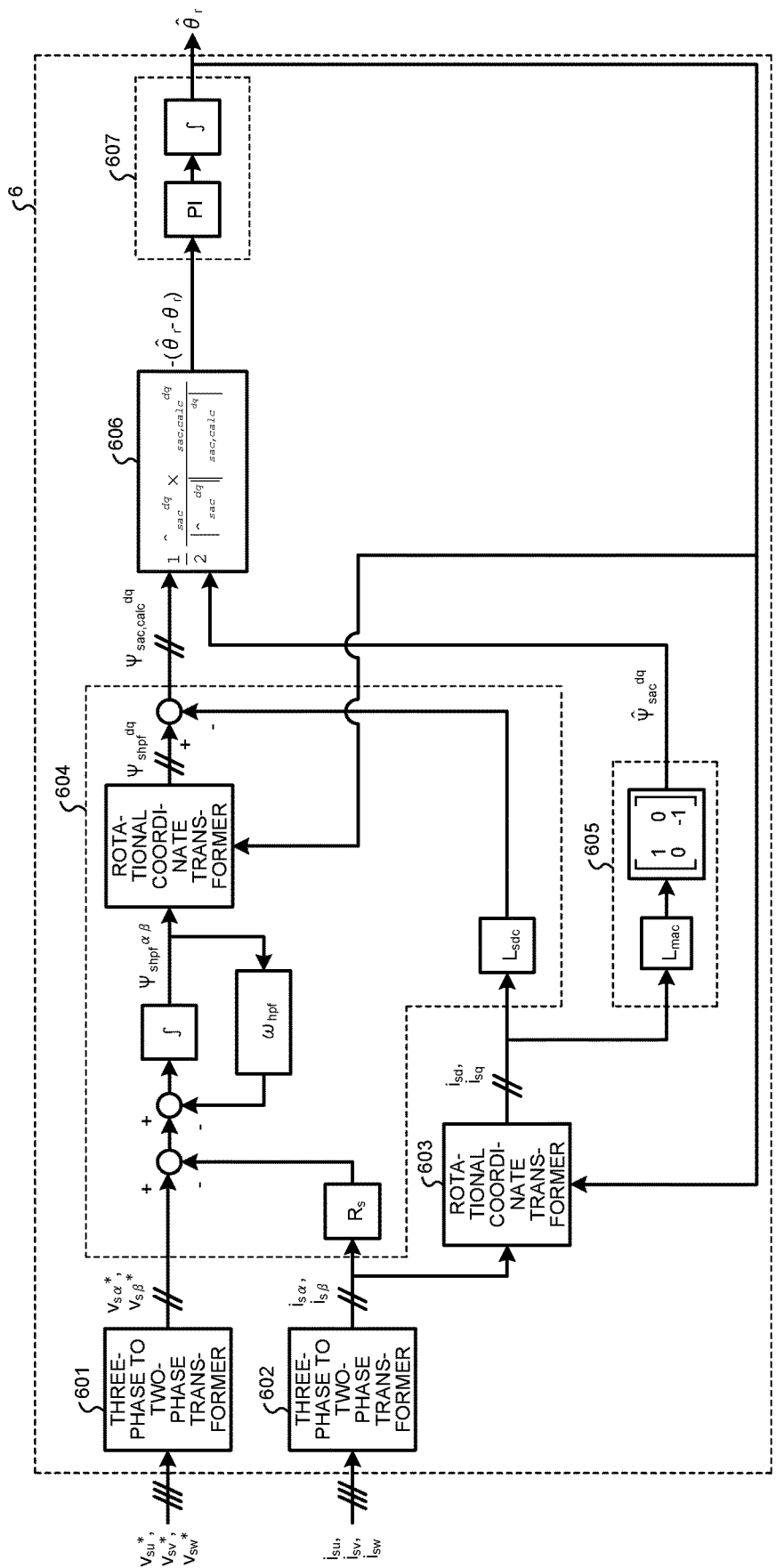
FIG. 4 is a diagram illustrating a configuration of a position estimator illustrated in FIG. 3.

FIG. 4 is a diagram illustrating a configuration of the position estimator illustrated in FIG. 3. As illustrated in FIG. 4, the position estimator 6 includes a three-phase to two-phase transformer 601, a three-phase to two-phase transformer 602, a rotational coordinate transformer 603, a flux linkage inductance variable component computing unit 604, a flux linkage inductance variable component estimator 605, a rotor position estimation error computing unit 606, and a rotor position computing unit 607. In the position estimator 6, the three-phase to two-phase transformer 602, the flux linkage inductance variable component computing unit 604, and the flux linkage inductance variable component estimator 605 operate differently from corresponding ones of the first embodiment. In the following description, the flux linkage inductance variable component computing unit 604 may also be referred to as "dynamic component computing unit 604", the flux linkage inductance variable component estimator 605 may also be referred to as "dynamic component estimator 605", and the rotor position estimation error computing unit 606 may also be referred to as "estimation error computing unit 606".

Similarly to the three-phase to two-phase transformer 301 of the first embodiment, the three-phase to two-phase transformer 601 transforms the rotary machine voltage instructions $v_{su}^*$, $v_{sv}^*$, and $v_{sw}^*$ represented in the three-phase reference frame to the rotary machine voltage instructions $v_{s\alpha}^*$ and $v_{s\beta}^*$ represented in the two-phase reference frame. Similarly to the three-phase to two-phase transformer 302 of the first embodiment, the three-phase to two-phase transformer 602 transforms the rotary machine currents $i_{su}$, $i_{sv}$, and $i_{sw}$ represented in the three-phase reference frame to the rotary machine currents $i_{s\alpha}$ and $i_{s\beta}$ represented in the two-phase reference frame.

The flux linkage $\Psi_s^{\alpha\beta}$ of the rotary machine is represented in the two-phase reference frame as Formula (8) above, while the flux linkage $\Psi_s^{dq}$ of the rotary machine represented by Formula (21) below is a result of rotational coordinate transformation of the flux linkage $\Psi_s^{\alpha\beta}$ of the rotary machine using the control coordinate angle $\theta_s$. The second term of Formula (21) below represents the flux linkage inductance variable component produced by the inductance variable component and by the rotary machine current.

[Formula 21]

$$\psi_s^{dq} = L_{sdc} i_s^{dq} + L_{mac} \begin{bmatrix} \cos(2(\theta_r - \theta_s)) & \sin(2(\theta_r - \theta_s)) \\ \sin(2(\theta_r - \theta_s)) & -\cos(2(\theta_r - \theta_s)) \end{bmatrix} i_s^{dq} \quad (21)$$

The dynamic component computing unit 604 first computes the flux linkage $\Psi_{shpf}^{\alpha\beta}$ represented in the two-phase reference frame using Formula (7) above similarly to the case in the first embodiment. The dynamic component computing unit 604 then performs rotational coordinate transformation on the flux linkage $\Psi_{shpf}^{\alpha\beta}$ to generate flux linkage $\Psi_{shpf}^{dq}$. A flux linkage inductance variable component $\Psi_{sac,calc}^{dq}$ represented in the rotating reference frame is computed using Formula (22) below on the basis of Formula (21) above. The flux linkage inductance variable component $\Psi_{sac,calc}^{dq}$ computed using Formula (22) below is hereinafter referred to as "flux linkage inductance variable component computed value".

[Formula 22]

$$\psi_{sac,calc}^{dq} = \psi_{shpf}^{dq} - L_{sdc} i_s^{dq} \quad (22)$$

The rotational coordinate transformer 603 performs rotational coordinate transformation on the rotary machine currents $i_{s\alpha}$ and $i_{s\beta}$ represented in the two-phase reference frame to the d- and q-axis currents $i_{sd}$ and $i_{sq}$ represented in the rotating reference frame using the estimated rotor position $\hat{\theta}_r$.

The dynamic component estimator 605 estimates the flux linkage inductance variable component using the rotary machine current $i_s^{dq}$ as shown by Formula (23) below.

[Formula 23]

$$\hat{\psi}_{sac}^{dq} = L_{mac} \begin{bmatrix} \cos(2(\hat{\theta}_r - \theta_s)) & \sin(2(\hat{\theta}_r - \theta_s)) \\ \sin(2(\hat{\theta}_r - \theta_s)) & -\cos(2(\hat{\theta}_r - \theta_s)) \end{bmatrix} i_s^{dq} \quad (23)$$

In this regard, use of the estimated rotor position $\hat{\theta}_r$ as the control coordinate angle $\theta_s$ in Formula (23) above allows Formula (23) above to be simplified as shown by Formula (24) below.

[Formula 24]

$$\hat{\psi}_{sac}^{dq} = L_{mac} \begin{bmatrix} 1 & 0 \\ 0 & -1 \end{bmatrix} i_s^{dq} \quad (24)$$

$\hat{\Psi}_{sac}^{dq}$ of Formula (24) above represents the flux linkage inductance variable component estimated value computed by the rotary machine control device 100A according to the second embodiment.

The estimation error computing unit 606 computes, similarly to the estimation error computing unit 305 of the first embodiment, the estimation error of the rotor position using the flux linkage inductance variable component computed value and the flux linkage inductance variable component estimated value. The rotor position computing unit 607 provides PI control on the estimation error of the rotor position, and then calculates an integral of the result, thus to compute the estimated rotor position $\hat{\theta}_r$, similarly to the rotor position computing unit 306 of the first embodiment.

The rotary machine control device 100A according to the second embodiment computes the flux linkage inductance variable component as shown by Formula (22) above, and estimates the flux linkage inductance variable component as shown by Formula (24) above, in a rotating reference frame synchronized with the rotor position. This flux linkage inductance variable component has both components of the two respective phases, and thus use of this flux linkage inductance variable component enables the rotor position to be estimated irrespective of the current flow direction. In addition, the rotary machine control device 100A according to the second embodiment does not need to perform weighting depending on the current flow direction. Moreover, in the second embodiment, Formula (24) above, which is an arithmetic equation for the flux linkage inductance variable component represented in the rotating reference frame, uses the inductance value on the d-axis in the rotating reference frame and the inductance value on the q-axis in the rotating reference frame. This eliminates the need to express the inductance using a sine function or cosine function of $2\theta_r$, where $\theta_r$ represents the rotor position. This prevents a rotor estimation error from occurring that would be caused by actual inductance of the rotary machine not accurately following a sine function or cosine function of $2\theta_r$. Furthermore, the second embodiment does not need a sine function or a cosine function of $2\theta_r$ to estimate the flux linkage inductance variable component. Thus, the rotary machine control device 100A according to the second embodiment provides an unprecedented significant advantage in being capable of accurately estimating the rotor position with a small amount of computation for control.

Third Embodiment

Figure 5:
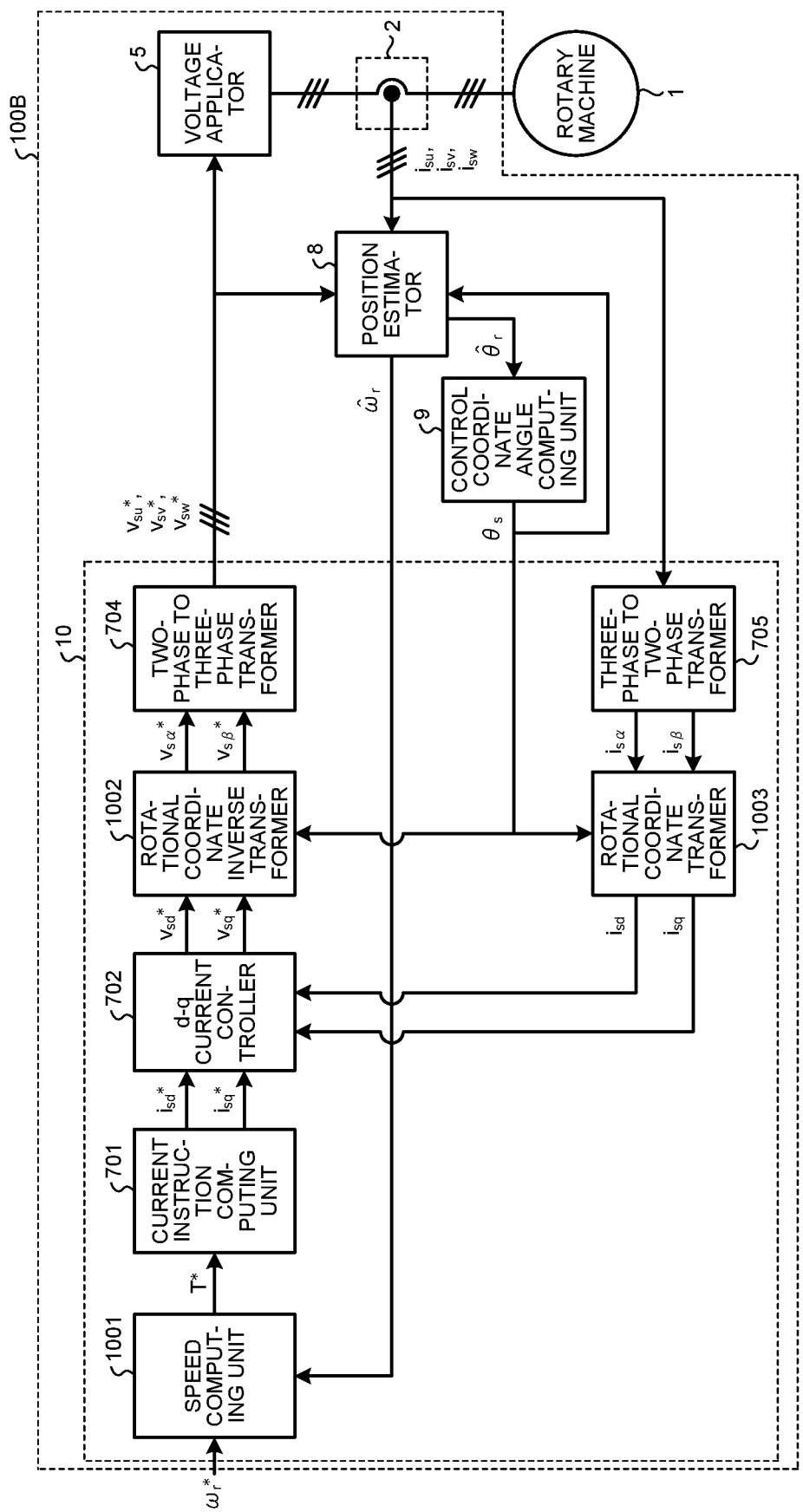
FIG. 5 is a diagram illustrating a configuration of a rotary machine control device according to a third embodiment of the present invention.

FIG. 5 is a diagram illustrating a configuration of a rotary machine control device according to a third embodiment of the present invention. A rotary machine control device 100B according to the third embodiment is configured to be capable of estimating the rotational speed and the rotational position of the rotor with a higher responsivity and more stably. The rotary machine control device 100B includes a position estimator 8 and a controller 10 in place of the position estimator 6 and the controller 7 according to the second embodiment illustrated in FIG. 3. The rotary machine control device 100B also includes a control coordinate angle computing unit 9. In the following description, the control coordinate angle computing unit 9 may also be referred to as "angle computing unit 9". The other part of the configuration is the same as, or equivalent to, the configuration of the second embodiment. The same or an equivalent configuration element is designated by the same reference character, and duplicate description thereof will be omitted.

The controller 10 includes a speed computing unit 1001, the current instruction computing unit 701, the d-q current controller 702, a rotational coordinate inverse transformer 1002, the two-phase to three-phase transformer 704, the three-phase to two-phase transformer 705, and a rotational coordinate transformer 1003 to compute the rotary machine voltage instructions $v_{su}^*$, $v_{sv}^*$, and $v_{sw}^*$ for causing the rotary machine to provide the rotational speed corresponding to a rotational speed instruction value $\omega_r^*$.

The speed computing unit 1001 provides, for example, proportional integral control such that an estimated rotational speed $\hat{\omega}_r$ becomes the rotational speed instruction value $\omega_r^*$, and computes the torque instruction value $T^*$.

The rotational coordinate inverse transformer 1002 performs rotational coordinate inverse transformation on the rotary machine voltage instructions $v_{sd}^*$ and $v_{sq}^*$ represented in the rotating reference frame to the rotary machine voltage instructions $v_{s\alpha}^*$ and $v_{s\beta}^*$ represented in the two-phase reference frame, using the control coordinate angle $\theta_s$ computed by the angle computing unit 9.

The rotational coordinate transformer 1003 performs rotational coordinate transformation on the rotary machine currents $i_{s\alpha}$ and $i_{s\beta}$ represented in the two-phase reference frame to the d- and q-axis currents $i_{sd}$ and $i_{sq}$ represented in the rotating reference frame, using the control coordinate angle $\theta_s$ computed by the angle computing unit 9.

Figure 6:
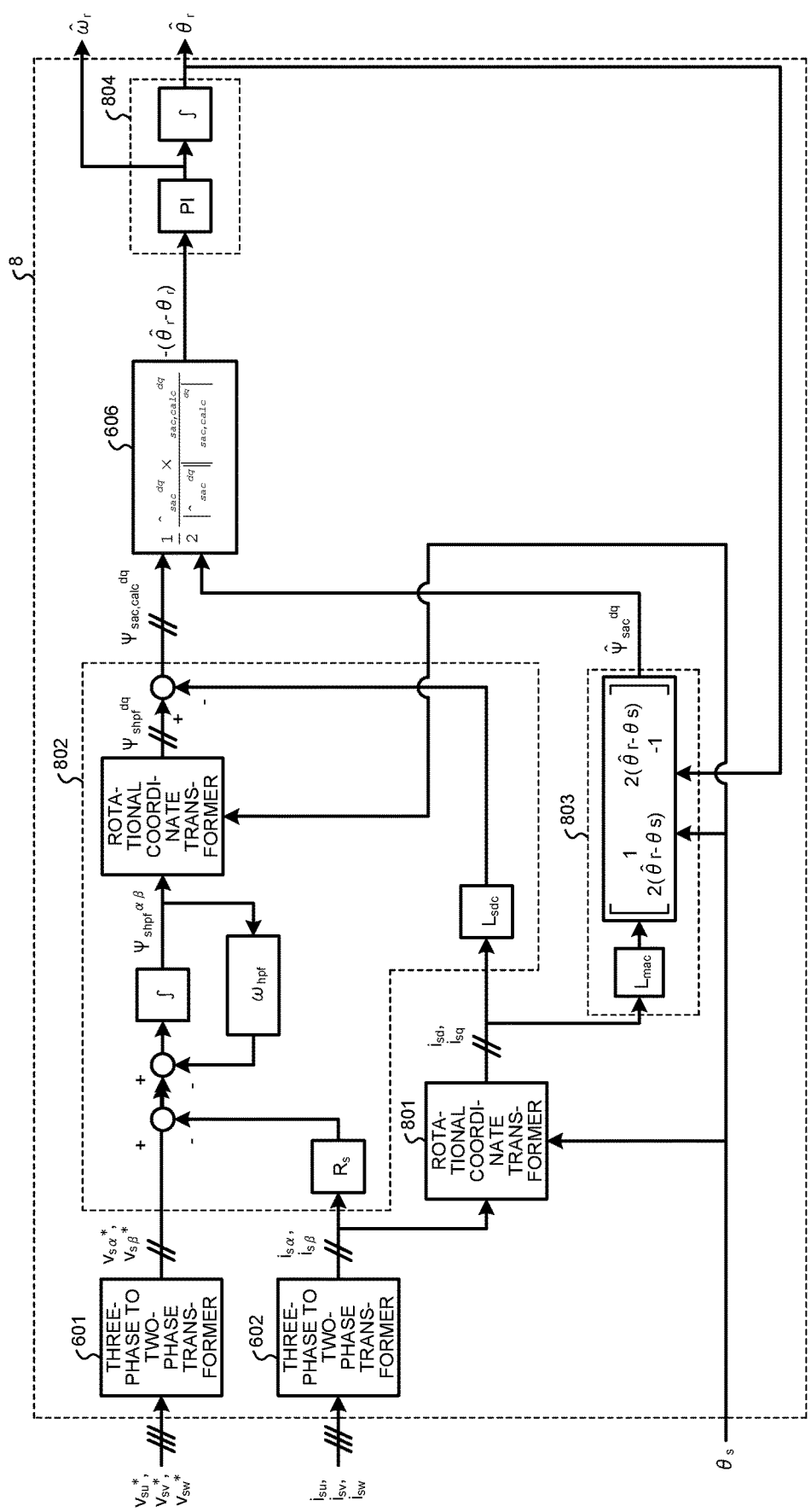
FIG. 6 is a diagram illustrating a configuration of a position estimator illustrated in FIG. 5.

The position estimator 8 computes the estimated rotational speed $\hat{\omega}_r$ and the estimated rotor position $\hat{\theta}_r$. FIG. 6 is a diagram illustrating a configuration of the position estimator illustrated in FIG. 5. As illustrated in FIG. 6, the position estimator 8 includes the three-phase to two-phase transformer 601, the three-phase to two-phase transformer 602, a rotational coordinate transformer 801, a flux linkage inductance variable component computing unit 802, a flux linkage inductance variable component estimator 803, the estimation error computing unit 606, and a rotor position computing unit 804. In the following description, the flux linkage inductance variable component computing unit 802 may also be referred to as "dynamic component computing unit 802", and the flux linkage inductance variable component estimator 803 may also be referred to as "dynamic component estimator 803".

Similarly to the case in the second embodiment, the dynamic component computing unit 802 calculates the flux linkage inductance variable component $\Psi_{sac,calc}^{dq}$ represented in the rotating reference frame, i.e., the flux linkage inductance variable component computed value. However, the rotational coordinate transformation is performed using the control coordinate angle $\theta_s$ rather than using the estimated rotor position $\hat{\theta}_r$.

The rotational coordinate transformer 801 performs rotational coordinate transformation on the rotary machine currents $i_{s\alpha}$ and $i_{s\beta}$ represented in the two-phase reference frame to the d- and q-axis currents $i_{sd}$ and $i_{sq}$ represented in the rotating reference frame, using the control coordinate angle $\theta_s$.

The dynamic component estimator 803 estimates, as shown by Formula (23) above, the flux linkage inductance variable component using the rotary machine current $i_s^{dq}$. Given that the position estimator 8 is operating such that the estimated rotor position $\hat{\theta}_r$ computed by the position estimator 8 will be nearly equal to the control coordinate angle $\theta_s$ computed by the angle computing unit 9, Formula (23) above, which is an arithmetic equation for the flux linkage inductance variable component, can be simplified as Formula (25) below.

[Formula 25]

$$\hat{\psi}_{sac}^{dq} = L_{mac} \begin{bmatrix} 1 & 2(\hat{\theta}_r - \theta_s) \\ 2(\hat{\theta}_r - \theta_s) & -1 \end{bmatrix} i_s^{dq} \quad (25)$$

$\hat{\Psi}_{sac}^{dq}$ of Formula (25) above is the flux linkage inductance variable component estimated value computed by the rotary machine control device 100B according to the third embodiment.

The rotor position computing unit 804 provides PI control on the estimation error of the rotor position to compute the estimated rotational speed $\hat{\omega}_r$. The rotor position computing unit 804 then integrates the estimated rotational speed $\hat{\omega}_r$ to compute the estimated rotor position $\hat{\theta}_r$.

Figure 7:
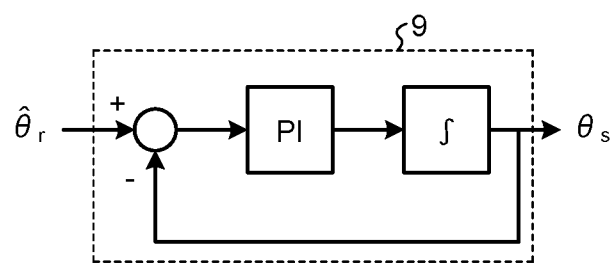
FIG. 7 is a diagram illustrating a configuration of a control coordinate angle computing unit illustrated in FIG. 5.

FIG. 7 is a diagram illustrating a configuration of the control coordinate angle computing unit 9 illustrated in FIG. 5. The angle computing unit 9 provides PI control on the error between the estimated rotor position $\hat{\theta}_r$ and the control coordinate angle $\theta_s$, and then integrates the result, thus to compute the control coordinate angle $\theta_s$, allowing the control coordinate angle $\theta_s$ to follow the estimated rotor position $\hat{\theta}_r$. The following response thereof is adjustable to any level using the gain of the proportional integral control.

The rotary machine control device 100B according to the third embodiment uses the control coordinate angle $\theta_s$, which follows the estimated rotor position $\hat{\theta}_r$ with any response, rather than directly using the estimated rotor position $\hat{\theta}_r$, as the angle for use in the rotational coordinate transformation by each of the position estimator 8 and the controller 10. Estimation of the rotor position and of the rotational speed with a higher responsivity may cause the response of the estimated rotor position $\hat{\theta}_r$ to be oscillatory. Also in this case, setting the control coordinate angle $\theta_s$ to follow with a responsivity lower than the position estimation responsivity to eliminate the oscillation enables the rotary machine control, including rotor position estimation, to be stably performed. Thus, the rotary machine control device 100B according to the third embodiment provides an unprecedented significant advantage in being capable of estimating the rotational speed and the rotational position of the rotor with a higher responsivity and more stably.

Fourth Embodiment

Figure 8:
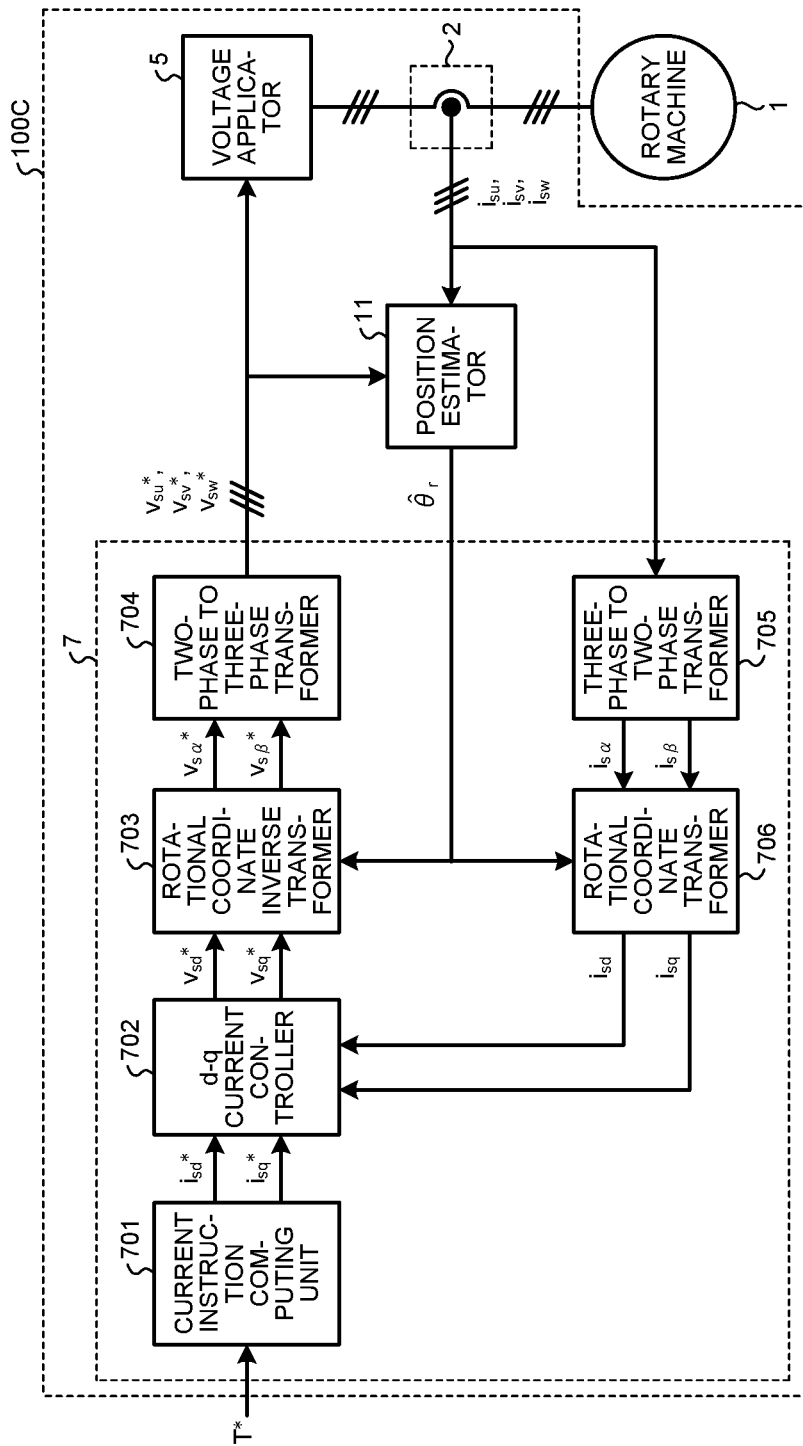
FIG. 8 is a diagram illustrating a configuration of a rotary machine control device according to a fourth embodiment of the present invention.

FIG. 8 is a diagram illustrating a configuration of a rotary machine control device according to a fourth embodiment of the present invention. The rotary machine control devices 100, 100A, and 100B according to the first, second, and third embodiments each estimate the rotor position using the computed value and the estimated value of the flux linkage inductance variable component. In contrast, a rotary machine control device 100C according to the fourth embodiment is configured to estimate the rotor position using an adaptive observer. The term "adaptive observer" refers to an entire observer when estimation is performed using adaptive estimation on the parameter (rotor position) included in Formula (34), which is an arithmetic equation for the factor H of Formula (33) described later. The rotary machine control device 100C includes a position estimator 11 in place of the position estimator 6 according to the second embodiment illustrated in FIG. 3. The other part of the configuration is the same as, or equivalent to, the configuration of the second embodiment. The same or an equivalent configuration element is designated by the same reference character, and duplicate description thereof will be omitted.

Figure 9:
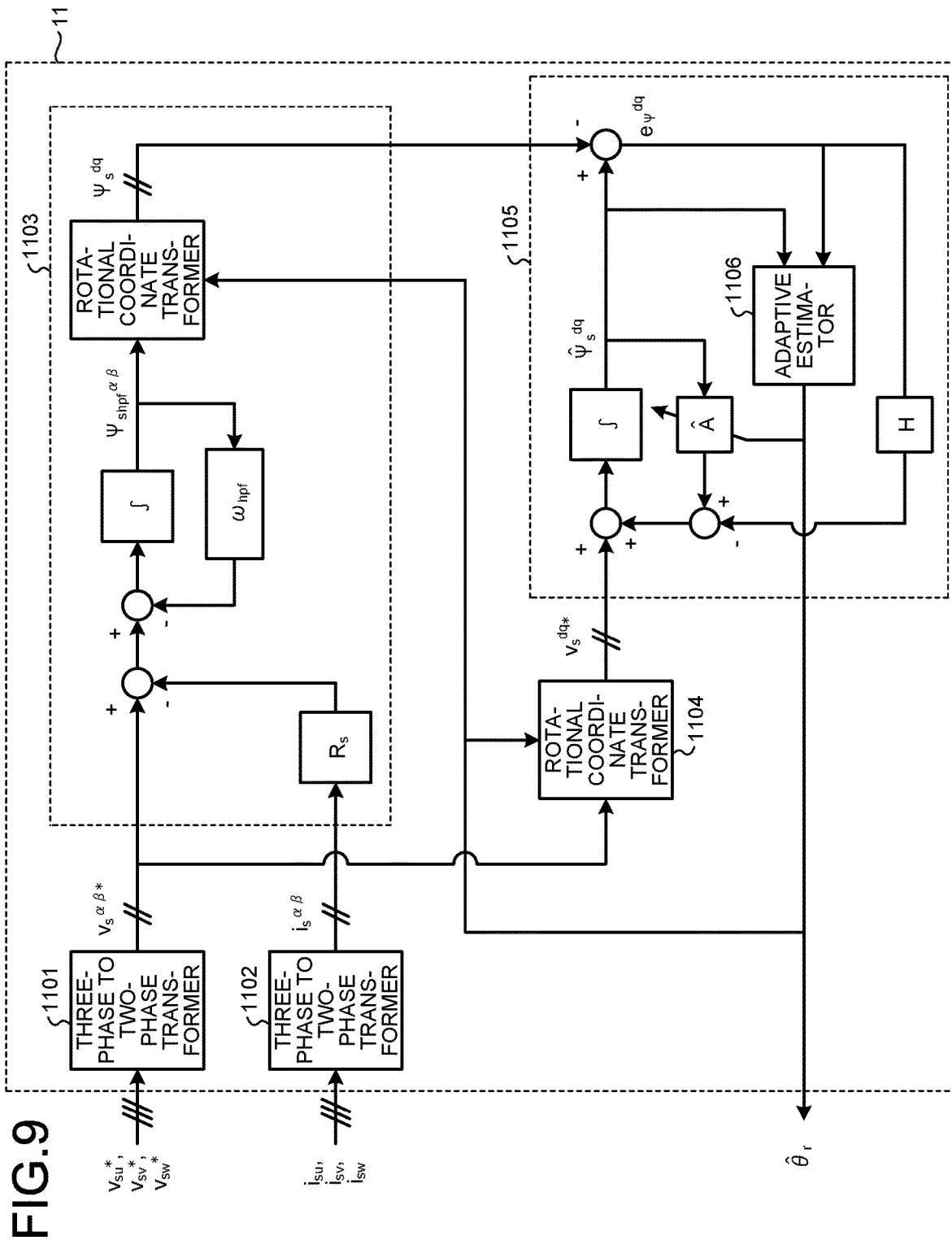
FIG. 9 is a diagram illustrating a configuration of a position estimator illustrated in FIG. 8.

FIG. 9 is a diagram illustrating a configuration of the position estimator illustrated in FIG. 8. The position estimator 11 includes a three-phase to two-phase transformer 1101, a three-phase to two-phase transformer 1102, a flux linkage inductance computing unit 1103, a rotational coordinate transformer 1104, an adaptive observer 1105, and an adaptive estimator 1106.

The three-phase to two-phase transformer 1101 performs coordinate transformation on the rotary machine voltage instructions represented in the three-phase reference frame to the rotary machine voltage instruction $v_s^{\alpha\beta*}$ represented in the two-phase reference frame. The three-phase to two-phase transformer 1102 performs coordinate transformation on the rotary machine currents represented in the three-phase reference frame to the rotary machine current $i_s^{\alpha\beta}$ represented in the two-phase reference frame. The flux linkage inductance computing unit 1103 computes, similarly to the case in the second embodiment, the flux linkage $\Psi_{shpf}^{\alpha\beta}$ represented in the two-phase reference frame, and then performs rotational coordinate transformation on the flux linkage $\Psi_{shpf}^{\alpha\beta}$ represented in the two-phase reference frame to the flux linkage $\Psi_s^{dq}$ represented in the rotating reference frame using the estimated rotor position $\hat{\theta}_r$.

Meanwhile, the rotational coordinate transformer 1104 transforms the rotary machine voltage instruction $v_s^{\alpha\beta*}$ represented in the two-phase reference frame to the rotary machine voltage instruction $v_s^{dq*}$ represented in the rotating reference frame. Then, the adaptive observer 1105 computes the estimated rotor position $\hat{\theta}_r$ using the rotary machine voltage instruction $v_s^{dq*}$ and the flux linkage $\Psi_s^{dq}$ represented in the rotating reference frame.

An operation of the adaptive observer 1105 will be described. First, a model of the rotary machine is expressed in the two-phase reference frame as Formulae (26) and (27) below.

[Formula 26]

$$v_s^{\alpha\beta} = R_s i_s^{\alpha\beta} + \frac{d}{dt}\psi_s^{\alpha\beta} \qquad (26)$$

[Formula 27]

$$\psi_s^{\alpha\beta} = \begin{bmatrix} L_{sdc} + L_{mac}\cos(2\theta_r) & L_{mac}\sin(2\theta_r) \\ L_{mac}\sin(2\theta_r) & L_{sdc} - L_{mac}\cos(2\theta_r) \end{bmatrix} i_s^{\alpha\beta} \qquad (27)$$

Taking the flux linkage as a parameter, the model of Formulae (26) and (27) above is expressed as Formula (28) below.

[Formula 28]

$$\frac{d}{dt}\psi_s^{\alpha\beta} = \qquad (28)$$
$$-\frac{R_s}{L_{sdc}^2 - L_{mac}^2}\begin{bmatrix} L_{sdc} - L_{mac}\cos(2\theta_r) & -L_{mac}\sin(2\theta_r) \\ -L_{mac}\sin(2\theta_r) & L_{sdc} + L_{mac}\cos(2\theta_r) \end{bmatrix}$$
$$\psi_s^{\alpha\beta} + v_s^{\alpha\beta}$$

The model of Formulae (26) and (27) above is expressed in the rotating reference frame as Formulae (29) and (30) below.

[Formula 29]

$$v_s^{dq} = R_s i_s^{dq} + \frac{d}{dt}\psi_s^{dq} + \omega_s J \psi_s^{dq} \qquad (29)$$

[Formula 30]

$$\psi_s^{dq} = \qquad (30)$$
$$\begin{bmatrix} L_{sdc} + L_{mac}\cos(2(\theta_r - \theta_s)) & L_{mac}\sin(2(\theta_r - \theta_s)) \\ L_{mac}\sin(2(\theta_r - \theta_s)) & L_{sdc} - L_{mac}\cos(2(\theta_r - \theta_s)) \end{bmatrix} i_s^{dq}$$

Taking the flux linkage as a parameter, the model of Formulae (29) and (30) above is expressed as Formula (31) below. Formula (31) below represents an observer for estimating the flux linkage $\Psi_s^{dq}$.

[Formula 31]

$$\frac{d}{dt}\psi_s^{dq} = -\frac{R_s}{L_{sdc}^2 - L_{mac}^2} \qquad (31)$$
$$\begin{bmatrix} L_{sdc} + L_{mac}\cos(2(\theta_r - \theta_s)) & -L_{mac}\sin(2(\theta_r - \theta_s)) \\ -L_{mac}\sin(2(\theta_r - \theta_s)) & L_{sdc} + L_{mac}\cos(2(\theta_r - \theta_s)) \end{bmatrix}\psi_s^{dq} -$$
$$\omega_s J \psi_s^{dq} + v_s^{dq}$$

In addition, assuming that the rotor position $\theta_r$ and the control coordinate angle $\theta_s$ are nearly equal to each other, that is, $\theta_r \approx \theta_s$, the model of Formula (31) above is expressed as Formula (32) below.

[Formula 32]

$$\frac{d}{dt}\psi_s^{dq} = \frac{R_s}{L_{sdc}^2 - L_{mac}^2}\begin{bmatrix} -L_{sdc}+L_{mac} & 2L_{mac}(\theta_r-\theta_s) \\ 2L_{mac}(\theta_r-\theta_s) & -L_{sdc}-L_{mac} \end{bmatrix}\psi_s^{dq} - \omega_s J\psi_s^{dq} + v_s^{dq} \quad (32)$$

To estimate the rotor position, the observer is first expressed as Formula (33) below.

[Formula 33]

$$\frac{d}{dt}\hat{\psi}_s^{dq} = \frac{R_s}{L_{sdc}^2 - L_{mac}^2}\begin{bmatrix} -L_{sdc}+L_{mac} & 2L_{mac}(\hat{\theta}_r-\theta_s) \\ 2L_{mac}(\hat{\theta}_r-\theta_s) & -L_{sdc}-L_{mac} \end{bmatrix}\hat{\psi}_s^{dq} - \omega_s J\hat{\psi}_s^{dq} + v_s^{dq} - H(\hat{\psi}_s^{dq} - \psi_s^{dq}) \quad (33)$$

At this point, as shown by Formula (34) below, appropriate designing of an observer gain H allows the estimated flux linkage $\Psi^{\wedge}{}_s^{dq}$ of the observer to converge at a response $\omega_{cobs}$, which is a true value. Note that the design of the observer gain H is not limited to the example of Formula (34) below.

[Formula 34]

$$H = \begin{bmatrix} \omega_{cobs} - \frac{R_s}{L_{sdc}+L_{mac}} & \frac{2R_sL_{mac}(\hat{\theta}_r-\theta_s)}{L_{sdc}^2-L_{mac}^2}+\omega_s \\ \frac{2R_sL_{mac}(\hat{\theta}_r-\theta_s)}{L_{sdc}^2-L_{mac}^2}-\omega_s & \omega_{cobs} - \frac{R_s}{L_{sdc}-L_{mac}} \end{bmatrix} \quad (34)$$

In the observer, an error of the estimated rotor position $\hat{\theta}_r$ will produce an error in the estimated flux linkage $\Psi^{\wedge}{}_s^{dq}$. The adaptive estimator 1106 computes the rotor position on the basis of an estimation error of the flux linkage relating to the flux linkage inductance variable component, resulting from an estimation error of the rotor position.

Figure 10:
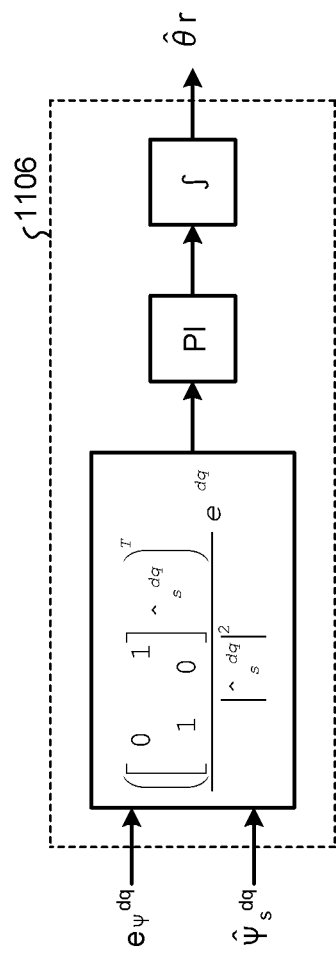
FIG. 10 is a diagram illustrating a configuration of an adaptive estimator illustrated in FIG. 9.

FIG. 10 is a diagram illustrating a configuration of the adaptive estimator illustrated in FIG. 9. As illustrated in FIG. 10, the adaptive estimator 1106 computes the estimated rotor position $\hat{\theta}_r$ of the rotor using an adaptive law of Formula (35) below.

[Formula 35]

$$\hat{\theta}_r = \frac{1}{s}k_{ap}\left(1+\frac{\omega_{ai}}{s}\right)\underbrace{\frac{\left(\begin{bmatrix} 0 & -1 \\ -1 & 0 \end{bmatrix}\hat{\psi}_s^{dq}\right)^T}{|\hat{\psi}_s^{dq}|^2}(\hat{\psi}_s^{dq}-\psi_s^{dq})}_{e_\psi^{dq}} \quad (35)$$

In this regard, assuming that $k_{ap}$ of Formula (35) above has the value computed using Formula (36) below, and that $\omega_{ai}$ of Formula (35) above has the value computed using Formula (37) below, the estimated response of the rotor position will be $\omega_{ca}$. The parameter $k_{ap}$ of Formula (35) above represents an adaptively estimated proportional gain, and $\omega_{ai}$ of Formula (35) above represents an adaptively estimated integral response.

[Formula 36]

$$k_{ap} = \omega_{ca}\omega_{cobs}\frac{L_{sdc}^2-L_{mac}^2}{2R_sL_{mac}} \quad (36)$$

[Formula 37]

$$\omega_{ai} = \frac{\omega_{ca}}{5} \quad (37)$$

In addition, the adaptive estimator 1106 extracts the estimation error of the rotor position utilizing the flux linkage inductance variable component by means of $e_1$ shown in Formula (38) below, i.e., a value included in Formula (35) above. The parameter $e_1$ of Formula (38) below represents "adaptive estimation error 1".

[Formula 38]

$$e_1 = \left(\begin{bmatrix} 0 & -1 \\ -1 & 0 \end{bmatrix}\hat{\psi}_s^{dq}\right)^T (\hat{\psi}_s^{dq}-\psi_s^{dq}) \quad (38)$$

Note that the selection of the adaptive law to estimate the rotor position is not limited to the foregoing method, but can be determined using, for example, Reference 1 given below.
(Reference 1) Ioan D. Landau and Masayoshi Tomizuka, Tekio Seigyo System no Riron to Jissai (English equivalence, Theory and Practice of Adaptive Control Systems), Ohmsha, Ltd., 1981

The rotary machine control device 100C according to the fourth embodiment estimates the rotor position using an estimation error of the flux linkage relating to the flux linkage inductance variable component corresponding to the term relating to Or expressed in Formulae (27) above to (32) above. This flux linkage inductance variable component has both components of the two respective phases, and thus use of this flux linkage inductance variable component enables the rotor position to be estimated irrespective of the current flow direction. In addition, the rotary machine control device 100C according to the fourth embodiment does not need to perform weighting depending on the current flow direction. Thus, the rotary machine control device 100C according to the fourth embodiment provides an unprecedented significant advantage in being capable of estimating the rotor position irrespective of the current flow direction of a rotary machine, with a simpler configuration.

Similarly to the case in the second embodiment, the rotary machine control device 100C according to the fourth embodiment computes the flux linkage, and then estimates the flux linkage, in the rotating reference frame synchronized with the rotor position; and thus provides an unprecedented significant advantage in being capable of accurately estimating the rotor position with a small amount of computation for control. The rotary machine control device 100C according to the fourth embodiment can obviously estimate the rotor position in the two-phase reference frame on the basis of Formulae (26) above to (28) above.

The rotary machine control device 1000 according to the fourth embodiment computes the rotor position by Formula (35) above using the computed value and the estimated value of the flux linkage. In this regard, the flux linkage inductance variable component estimated value $\Psi^{\wedge}{}_{sac}^{dq}$ can be computed using Formula (39) below.

[Formula 39]

$$\hat{\psi}_{sac}^{dq} = \hat{\psi}_s^{dq} - L_{sdc}i_s^{dq} \quad (39)$$

Needless to say, the rotary machine control device 100C according to the fourth embodiment can estimate the rotor position, similarly to the cases in the first, second, and third embodiments, using the flux linkage inductance variable component estimated value computed using Formula (39) above, and using the flux linkage inductance variable component computed value. Also needless to say, the rotary machine control device 100C according to the fourth embodiment can use, similarly to the case in the third embodiment, the control coordinate angle $\theta_s$, which follows the estimated rotor position $\hat{\theta}_r$, rather than directly using the estimated rotor position $\hat{\theta}_r$, as the angle for use in the rotational coordinate transformation by each of the position estimator 11 and the controller 7.

Fifth Embodiment

Figure 11:
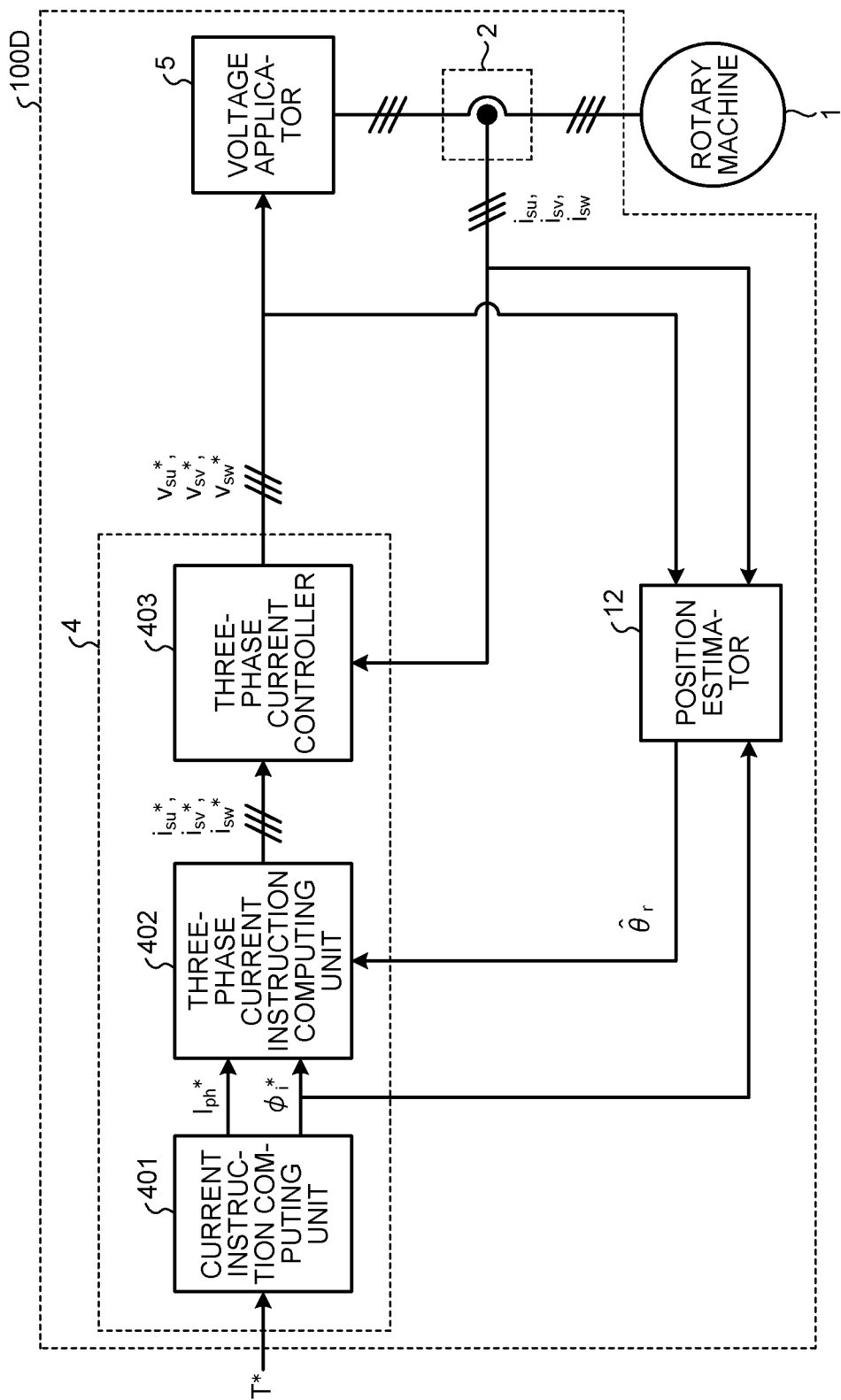
FIG. 11 is a diagram illustrating a configuration of a rotary machine control device according to a fifth embodiment of the present invention.

FIG. 11 is a diagram illustrating a configuration of a rotary machine control device according to a fifth embodiment of the present invention. The rotary machine control devices 100, 100A, and 100B according to the first, second, and third embodiments each estimate the rotor position using the computed value and the estimated value of the flux linkage inductance variable component, and the rotary machine control device 100C according to the fourth embodiment estimates the rotor position using the adaptive observer. A rotary machine control device 100D according to the fifth embodiment is configured to estimate the rotor position using the computed value of the flux linkage inductance variable component, the current flow angle, and the rotor position. The rotary machine control device 100D includes a position estimator 12 in place of the position estimator 3 illustrated in FIG. 1. The other part of the configuration is the same as, or equivalent to, the configuration of the first embodiment. The same or an equivalent configuration element is designated by the same reference character, and duplicate description thereof will be omitted.

Figure 12:
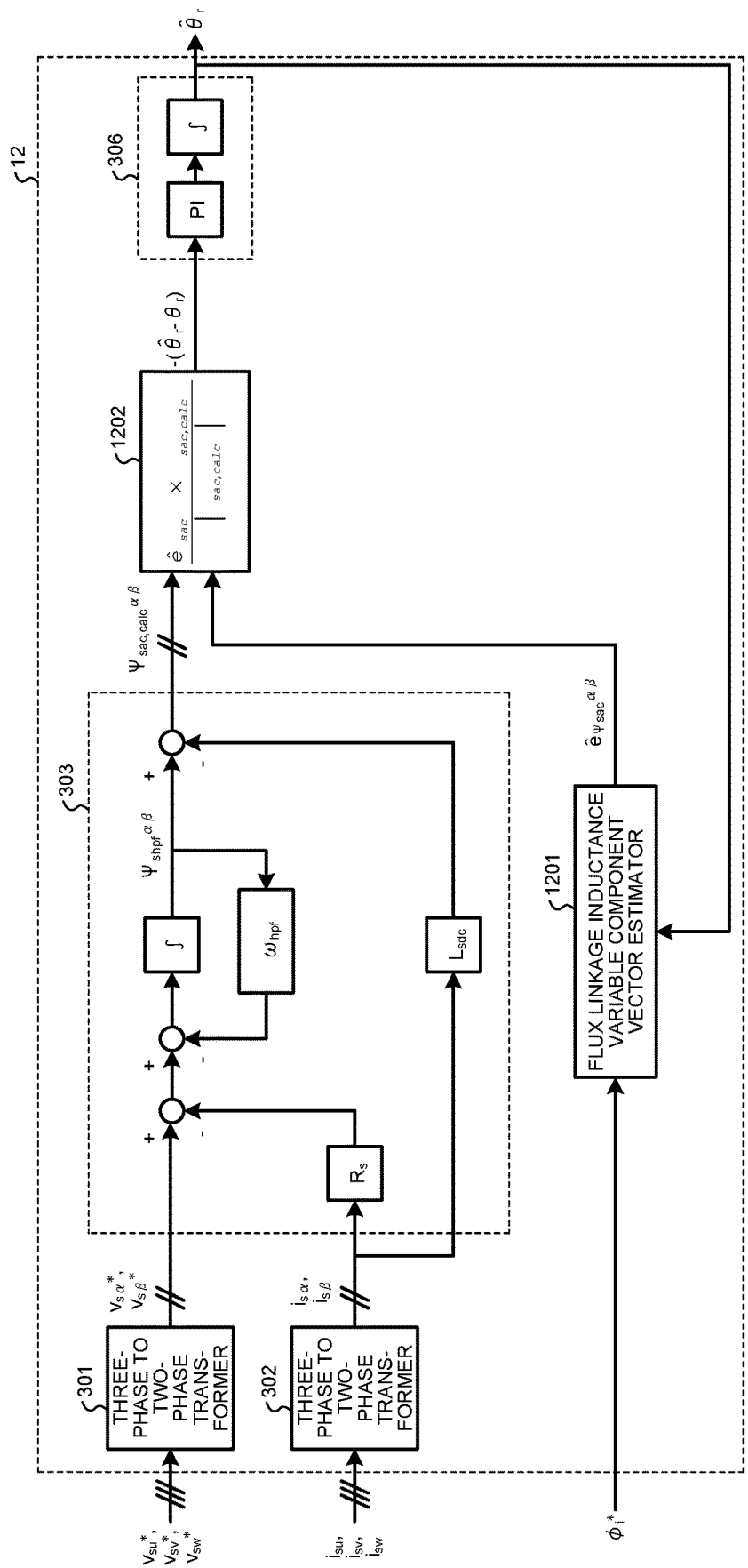
FIG. 12 is a diagram illustrating a configuration of a position estimator illustrated in FIG. 11.

FIG. 12 is a diagram illustrating a configuration of the position estimator illustrated in FIG. 11. As illustrated in FIG. 12, the position estimator 12 includes the three-phase to two-phase transformer 301, the three-phase to two-phase transformer 302, the dynamic component computing unit 303, a flux linkage inductance variable component vector estimator 1201, a rotor position estimation error computing unit 1202, and the rotor position computing unit 306. In the position estimator 12, the flux linkage inductance variable component vector estimator 1201 and the rotor position estimation error computing unit 1202 operate differently from corresponding ones of the first embodiment.

First, computation of the flux linkage inductance variable component given by the second term of Formula (8) above using the current RMS value $I_{ph}$ of Formula (14) above enables $\Psi_{sac}^{\alpha\beta}$ shown in Formula (40) below to be computed. $\Psi_{sac}^{\alpha\beta}$ of Formula (40) below represents the flux linkage inductance variable component represented in the two-phase reference frame.

[Formula 40]

$$\psi_{sac}^{\alpha\beta} = \sqrt{3} L_{mac} I_{ph} \underbrace{\begin{bmatrix} \cos(\theta_r - \varphi_i) \\ \sin(\theta_r - \varphi_i) \end{bmatrix}}_{e_{\psi sac}^{\alpha\beta}} \quad (40)$$

Formula (40) above indicates that the flux linkage inductance variable component rotates at a phase obtained by subtraction of the current flow angle of the rotary machine current from the rotor position. In addition, in the fifth embodiment, "$e_{\psi sac}^{\alpha\beta}$" of Formula (40) above is referred to as "flux linkage inductance variable component vector", where $e_{\psi sac}^{\alpha\beta}$ is a vector in the same direction as the flux linkage inductance variable component.

The flux linkage inductance variable component vector estimator 1201 computes, as shown by Formula (41) below, a flux linkage inductance variable component vector estimated value $\hat{e}_{\psi sac}^{\alpha\beta}$ using the current flow angle instruction $\varphi_i^*$ and the estimated rotor position $\hat{\theta}_r$.

[Formula 41]

$$\hat{e}_{\psi sac}^{\alpha\beta} = \begin{bmatrix} \cos(\hat{\theta}_r - \varphi_s^*) \\ \sin(\hat{\theta}_r - \varphi_s^*) \end{bmatrix} \quad (41)$$

The rotor position estimation error computing unit 1202 computes the estimation error of the rotor position using the flux linkage inductance variable component computed value $\Psi_{sac,calc}^{\alpha\beta}$ and the flux linkage inductance variable component vector estimated value $\hat{e}_{\psi sac}^{\alpha\beta}$. Assuming that the current flow angle $\varphi_i$ is equal to the current flow angle instruction $\varphi_i^*$, the cross product of the flux linkage inductance variable component computed value $\Psi_{sac,calc}^{\alpha\beta}$ and the flux linkage inductance variable component vector estimated value $\hat{e}_{\psi sac}^{\alpha\beta}$ can be expressed by Formula (42) below. Note that the flux linkage inductance variable component computed value $\Psi_{sac,calc}^{\alpha\beta}$ is the result of computation of Formula (40) above based on Formula (9) above using the rotary machine voltage instruction and the rotary machine current.

[Formula 42]

$$\hat{e}_{\psi sac}^{\alpha\beta} \times \psi_{sac,calc}^{\alpha\beta} = |\psi_{sac,calc}^{\alpha\beta}| \sin(\theta_r - \hat{\theta}_r) \quad (42)$$

Assuming here that the estimated value and the true value of the rotor position are nearly equal to each other, i.e., $\hat{\theta}_r \approx \theta_r$, the estimation error of the rotor position can be computed using Formula (43) below. The estimated rotor position can be computed from this estimation error of the rotor position similarly to the case in the first embodiment.

[Formula 43]

$$-(\hat{\theta}_r - \theta_r) = \frac{\hat{e}_{\psi sac}^{\alpha\beta} \times \psi_{sac,calc}^{\alpha\beta}}{|\psi_{sac,calc}^{\alpha\beta}|} \quad (43)$$

The rotary machine control device 100D according to the fifth embodiment estimates the rotor position using the flux linkage inductance variable component and a vector in the same direction therewith, that is, using Formulae (40) and (41) above. Note that this vector in the same direction, i.e., the flux linkage inductance variable component vector, is computed using the current flow angle instruction and the estimated rotor position. The flux linkage inductance variable component and the flux linkage inductance variable component vector described above each have both components of the two respective phases, and thus use of the flux linkage inductance variable component and the flux linkage inductance variable component vector enables the rotor position to be estimated irrespective of the current flow direction. In addition, the rotary machine control device 100D according to the fifth embodiment does not need to perform weighting depending on the current flow direction. Thus, the rotary machine control device 100D according to the fifth embodiment provides an unprecedented significant advantage in being capable of estimating the rotor position irrespective of the current flow direction of a rotary machine, with a simpler configuration.

The functionalities of each of the rotary machine control devices 100, 100A, 100B, 100C, and 100D according to the first through fifth embodiments can be implemented in a processing circuit. The functionalities respectively correspond to the current detector 2, the voltage applicator 5, the position estimators 3, 6, 8, 11, and 12, the controllers 4, 7, and 10, and the angle computing unit 9.

Figure 13:
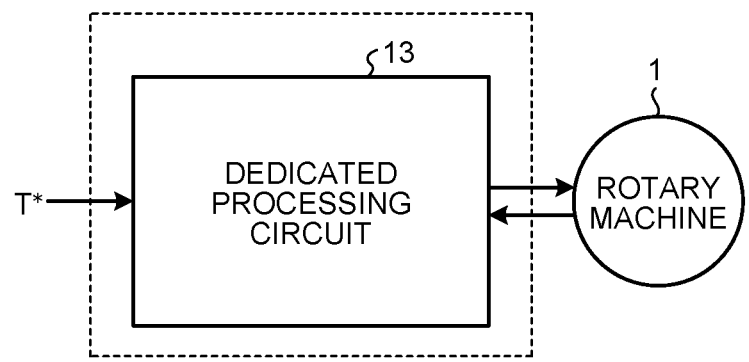
FIG. 13 is a diagram illustrating a first hardware configuration example of the rotary machine control devices according to the first through fifth embodiments of the present invention.

FIG. 13 is a diagram illustrating a first hardware configuration example of the rotary machine control devices according to the first through fifth embodiments of the present invention. FIG. 13 illustrates an example in which a dedicated hardware element such as a dedicated processing circuit 13 is used to implement the foregoing processing circuit. As illustrated in FIG. 13, in the case of use of a dedicated hardware element, the dedicated processing circuit 13 is a single circuit, a set of multiple circuits, a programmed processor, a set of multiple programmed processors, an application specific integrated circuit (ASIC), a field-programmable gate array (FPGA), or a combination thereof. The functionalities described above may each be implemented in an individual processing circuit, or may be collectively implemented in a processing circuit.

Figure 14:
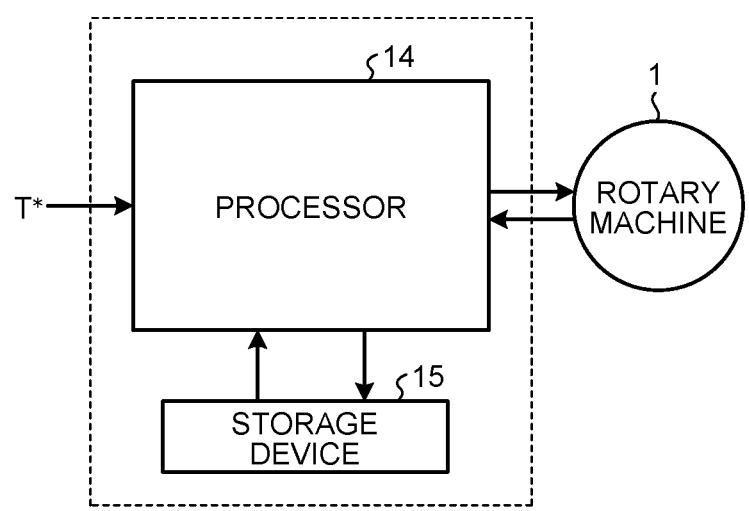
FIG. 14 is a diagram illustrating a second hardware configuration example of the rotary machine control devices according to the first through fifth embodiments.

FIG. 14 is a diagram illustrating a second hardware configuration example of the rotary machine control devices according to the first through fifth embodiments. FIG. 14 illustrates an example in which a processor 14 and a storage device 15 are used to implement the foregoing processing circuit. As illustrated in FIG. 14, in the case of use of the processor 14 and the storage device 15, each of the functionalities described above is implemented in software, firmware, or a combination thereof. The software or firmware is described as a program or programs, and is stored in the storage device 15. The processor 14 reads and executes a program stored in the storage device 15. It can also be said that these programs cause a computer to perform a procedure or method to be performed for each of the functionalities described above. The storage device 15 is a semiconductor memory such as a random access memory (RAM), a read-only memory (ROM), a flash memory, an erasable programmable read-only memory (EPROM), or an electrically erasable programmable read-only memory (EEPROM) (registered trademark). The semiconductor memory may be a non-volatile memory or a volatile memory. Also, the storage device 15 may not be a semiconductor memory, but rather be a magnetic disk, a flexible disk, an optical disk, a compact disc, a MiniDisc, or a digital versatile disc (DVD).

In addition, each of the functionalities described above may be implemented partially in hardware and partially in software or firmware. As a specific example, the functionalities of the current detector 2 and the voltage applicator 5 are implemented using a dedicated hardware element, while the functionalities of the position estimators 3, 6, 8, 11, and 12, the controllers 4, 7, and 10, and the angle computing unit 9 are implemented using the processor 14 and the storage device 15.

In the first through fifth embodiments, the current instruction for the torque of the rotary machine is selected to minimize the RMS value, i.e., the copper loss of the rotary machine, but needless to say, may also be selected to reduce the flux linkage, i.e., the induced voltage of the rotary machine, to allow the rotary machine to operate at a higher speed, or otherwise be selected to minimize the motor loss. In addition, in the first through fifth embodiments, the description has been given of an example configuration in which the current detector 2 detects the phase currents flowing through the rotary machine, but the phase currents flowing through the rotary machine may also be detected by a current sensor, a shunt resistor, or the like incorporated in an inverter that is the voltage applicator 5. Moreover, for the purpose of facilitating understanding of the description, the first through fifth embodiments have been described such that coordinate transformation of the voltage and the current of the rotary machine in the controllers and coordinate transformation of the voltage and the current of the rotary machine in the position estimators are redundantly performed, but these coordinate transformation operations may be performed using functionality common to the controllers and to the position estimators.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 1 rotary machine; 2 current detector; 3, 6, 8, 11, 12 position estimator; 4, 7, 10 controller; 5 voltage applicator; 9 control coordinate angle computing unit; 13 dedicated processing circuit; 14 processor; 15 storage device; 100, 100A, 100B, 100C, 100D control device; 301, 302, 601, 602, 705, 1101, 1102 three-phase to two-phase transformer; 303, 304, 604, 802 flux linkage inductance variable component computing unit; 305, 606, 1202 rotor position estimation error computing unit; 306, 607, 804 rotor position computing unit; 401, 701 current instruction computing unit; 402 three-phase current instruction computing unit; 403 three-phase current controller; 603 rotational coordinate transformer; 706, 801, 1003, 1104 rotational coordinate transformer; 605, 803 flux linkage inductance variable component estimator; 702 d-q current controller; 703, 1002 rotational coordinate inverse transformer; 704 two-phase to three-phase transformer; 1001 speed computing unit; 1103 flux linkage inductance computing unit; 1105 adaptive observer; 1106 adaptive estimator; 1201 flux linkage inductance variable component vector estimator.

The invention claimed is:

1. A rotary machine control device for controlling a rotary machine whose inductance includes an inductance variable component that changes with a rotor position, the rotary machine control device comprising:
  a current detector to detect a rotary machine current flowing through the rotary machine;
  a position estimator to estimate the rotor position;
  a controller to output a rotary machine voltage instruction for driving the rotary machine on a basis of the rotary machine current and the rotor position; and
  a voltage applicator to apply a voltage to the rotary machine on a basis of the rotary machine voltage instruction, wherein
  the position estimator estimates the rotor position from a flux linkage inductance variable component produced by the inductance variable component and the rotary machine current, the inductance of the rotary machine includes a first component that does not change with the rotor position and a second component that changes at a frequency twice as high as the rotor position, and the inductance variable component is the second component.

2. The rotary machine control device according to claim 1, wherein the position estimator estimates the rotor position using a flux linkage inductance variable component computed value that is the flux linkage inductance variable component computed from the rotary machine voltage instruction and from the rotary machine current, and a flux linkage inductance variable component estimated value that is the flux linkage inductance variable component estimated from the rotary machine current, from the inductance variable component, and from the rotor position.

3. The rotary machine control device according to claim 2, wherein the position estimator computes an estimation error of the rotor position from a cross product of the flux linkage inductance variable component computed value and the flux linkage inductance variable component estimated value.

4. The rotary machine control device according to claim 1, wherein the position estimator computes or estimates the flux linkage inductance variable component in a rotating reference frame synchronized with rotation of the rotary machine.

5. The rotary machine control device according to claim 4, comprising:

a control coordinate angle calculator to cause a control coordinate angle to follow the rotor position that is estimated, wherein the position estimator computes the flux linkage inductance variable component in the rotating reference frame that is transformed using the control coordinate angle, and estimates the flux linkage inductance variable component in the rotating reference frame that is transformed using the control coordinate angle.

6. The rotary machine control device according to claim 1, wherein the position estimator estimates the rotor position using a flux linkage inductance variable component computed value computed from the rotary machine voltage instruction and the rotary machine current, using a current flow angle that is an angular difference between the rotary machine current and the rotor position, and using the rotor position.

7. The rotary machine control device according to claim 6, wherein the position estimator estimates, from the current flow angle and the rotor position, a flux linkage inductance variable component vector that is a vector in a same direction as the flux linkage inductance variable component, and computes an estimation error of the rotor position from a cross product of the flux linkage inductance variable component computed value and an estimated value of the flux linkage inductance variable component vector that is estimated.

8. The rotary machine control device according to claim 1, wherein the position estimator estimates flux linkage using an observer, and estimates the rotor position using an estimation error of the flux linkage inductance variable component that is estimated.

9. The rotary machine control device according to claim 8, wherein the position estimator computes or estimates the flux linkage in a rotating reference frame synchronized with rotation of the rotary machine.

10. The rotary machine control device according to claim 9, wherein the position estimator computes the rotor position using Formula (1) below including the flux linkage represented in a rotating reference frame and an estimated value of the flux linkage represented in the rotating reference frame:

[Formula 1]

$$e_1 = \left( \begin{bmatrix} 0 & -1 \\ -1 & 0 \end{bmatrix} \hat{\psi}_s^{dq} \right)^T (\hat{\psi}_s^{dq} - \psi_s^{dq}) \qquad (1)$$

where $e_1$ represents an adaptive estimation error, $\Psi_s^{dq}$ represents the flux linkage represented in a rotating reference frame, and $\hat{\Psi}_s^{dq}$ represents an estimated value of the flux linkage represented in the rotating reference frame.

11. The rotary machine control device according to claim 1, comprising:

a control coordinate angle calculator to cause a control coordinate angle to follow the rotor position that is estimated, wherein the controller performs rotational coordinate transformation on the rotary machine current using the control coordinate angle to compute the rotary machine voltage instruction.

12. The rotary machine control device according to claim 11, wherein the control coordinate angle has a following response slower than an estimation response of the rotor position.

13. The rotary machine control device according to claim 11, comprising:

a control coordinate angle calculator to cause a control coordinate angle to follow the rotor position that is estimated, wherein the position estimator computes the flux linkage inductance variable component in the rotating reference frame that is transformed using the control coordinate angle, and estimates the flux linkage inductance variable component in the rotating reference frame that is transformed using the control coordinate angle.

* * * * *